United States Patent
Gifford et al.

(10) Patent No.: US 10,800,678 B2
(45) Date of Patent: Oct. 13, 2020

(54) IN-SITU DELIVERY SYSTEMS FOR REACTION PRODUCT ABATEMENT IN ELECTROCHEMICAL CELLS

(71) Applicant: Evoqua Water Technologies, LLC, Pittsburgh, PA (US)

(72) Inventors: Joseph D. Gifford, Marlborough, MA (US); Joshua Griffis, Ashburnham, MA (US); Simon P. Dukes, Chelmsford, MA (US); Li-Shiang Liang, Harvard, MA (US); Michael J. Shaw, Derry, NH (US); Frederick C. Wilkins, Pepperell, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 243 days.

(21) Appl. No.: 15/760,400

(22) PCT Filed: Sep. 16, 2016

(86) PCT No.: PCT/US2016/052083
§ 371 (c)(1),
(2) Date: Mar. 15, 2018

(87) PCT Pub. No.: WO2017/049052
PCT Pub. Date: Mar. 23, 2017

(65) Prior Publication Data
US 2018/0257961 A1      Sep. 13, 2018

Related U.S. Application Data

(60) Provisional application No. 62/220,313, filed on Sep. 18, 2015, provisional application No. 62/222,290, (Continued)

(51) Int. Cl.
C02F 1/467      (2006.01)
C25B 1/26       (2006.01)
(Continued)

(52) U.S. Cl.
CPC .......... *C02F 1/4674* (2013.01); *C02F 1/4676* (2013.01); *C02F 1/46109* (2013.01); *C25B 1/26* (2013.01); *C25B 3/04* (2013.01); *C25B 15/02* (2013.01); *C25B 15/08* (2013.01); *C02F 2001/46152* (2013.01); *C02F 2001/46171* (2013.01); *C02F 2103/008* (2013.01);
(Continued)

(58) Field of Classification Search
None
See application file for complete search history.

(56) References Cited

U.S. PATENT DOCUMENTS

| 820,113 A | * | 5/1906 | Hinkson | ............. | C02F 1/46109 |
| | | | | | 204/268 |
| 4,101,394 A | | 7/1978 | Johnson | | |

(Continued)

*Primary Examiner* — Harry D Wilkins, III

(57) ABSTRACT

An electrochlorination system comprising an electrochemical cell including a housing having an inlet, an outlet, and an anode-cathode pair disposed within the housing, a source of a chloride-containing aqueous solution having an outlet fluidly connectable to the inlet of the electrochemical cell, and a source of an oxidizing agent fluidly connectable to the source of chloride-containing aqueous solution upstream of the electrochemical cell.

15 Claims, 36 Drawing Sheets

Related U.S. Application Data filed on Sep. 23, 2015, provisional application No. 62/288,073, filed on Jan. 28, 2016.

(51) Int. Cl.

| | |
|---|---|
| *C25B 15/02* | (2006.01) |
| *C02F 1/461* | (2006.01) |
| *C25B 15/08* | (2006.01) |
| *C25B 3/04* | (2006.01) |
| *C02F 103/00* | (2006.01) |
| *C02F 103/02* | (2006.01) |
| *C02F 103/08* | (2006.01) |

(52) U.S. Cl.
CPC .... *C02F 2103/023* (2013.01); *C02F 2103/08* (2013.01); *C02F 2201/4612* (2013.01); *C02F 2201/4618* (2013.01); *C02F 2209/02* (2013.01); *C02F 2209/04* (2013.01); *C02F 2209/06* (2013.01); *C02F 2209/29* (2013.01)

(56) References Cited

U.S. PATENT DOCUMENTS

| | | | |
|---|---|---|---|
| 6,348,143 B1 * | 2/2002 | Serikawa | B01J 3/04 204/242 |
| 2005/0048364 A1 | 3/2005 | Coffey et al. | |
| 2006/0027463 A1 | 2/2006 | Lavelle et al. | |
| 2008/0277354 A1 * | 11/2008 | Baerheim | B63J 4/002 210/750 |
| 2010/0219077 A1 * | 9/2010 | Sohn | C02F 1/4674 204/666 |
| 2011/0024361 A1 | 2/2011 | Schwartzel et al. | |
| 2011/0120956 A1 | 5/2011 | Ivanter et al. | |
| 2012/0085659 A1 * | 4/2012 | Bachleitner | C25B 1/46 205/620 |
| 2014/0027288 A1 | 1/2014 | Nyberg et al. | |

\* cited by examiner

IN-SITU DELIVERY SYSTEMS FOR REACTION PRODUCT ABATEMENT IN ELECTROCHEMICAL CELLS

CROSS-REFERENCE TO RELATED APPLICATION

This application claims priority under 35 U.S.C. § 119(e) to U.S. Provisional Application Ser. No. 62/220,313, titled "GAS DIFFUSION ELECTRODE ARCHITECTURES," filed on Sep. 18, 2015, U.S. Provisional Application Ser. No. 62/222,290, titled "IN-SITU DELIVERY SYSTEMS FOR REACTION PRODUCT ABATEMENT IN ELECTROCHEMICAL CELLS," filed on Sep. 23, 2015, and U.S. Provisional Application Ser. No. 62/288,073, titled "GAS SEPARATION MEMBRANE/AIR CATHODE METHOD AND APPARATUS FOR BALLAST WATER TREATMENT," filed Jan. 28, 2016. Each of these applications is incorporated herein by reference in its entirety for all purposes.

BACKGROUND

1. Field of Invention

Aspects and embodiments disclosed herein are generally directed to electrochemical devices, and more specifically, to electrochlorination cells and devices, methods of operating same, and systems utilizing same.

2. Discussion of Related Art

Electrochemical devices that generate chemical reactions at electrodes are widely used in industrial and municipal implementations. Electrochemical reactions for the generation of sodium hypochlorite from sodium chloride and water (electrochlorination) include the following:

Reaction at anode: $2Cl^- \rightarrow Cl_2 + 2e^-$ ($E^0_{ox} = -1.358$ V)

Reaction at cathode: $2H_2O + 2e^- \rightarrow H_2 + 2OH^-$ ($E^0_{red} = -0.8277$ V)

In solution: $Cl_2 + 2OH^- \rightarrow ClO^- + Cl^- + H_2O$

Overall reaction: $NaCl + H_2O \rightarrow NaOCl + H_2$

In these reactions, electrical potentials listed are under conditions of 1M concentration (activity) of the reactants and products as well as standard condition (25° C. and 1 atm.)

From the above reactions it can be seen that a byproduct of electrochemical production of sodium hypochlorite from sodium chloride and water is hydrogen. The production of hydrogen in an electrochlorination cell is undesirable. If sufficient hydrogen is produced such that the concentration of hydrogen exceeds the solubility limit of hydrogen in water, the hydrogen may evolve as hydrogen gas, which poses an explosion hazard. Hydrogen gas present in an electrochlorination cell may also shield portions of electrodes of the electrochlorination cells from contact with electrolyte in the cell, reducing the effective electrode area and reducing sodium hypochlorite generation efficiency. Further, diffusion of hydrogen into material such as titanium from which electrodes in electrochlorination cells are often formed may lead to embrittlement of the electrodes and increase the potential for mechanical failure of the electrodes. Electrochlorination systems for the generation of sodium hypochlorite from sodium chloride and water are thus typically equipped with gas-liquid separators and/or blowers to remove hydrogen from solution and/or from the atmosphere or at least keep the concentration of hydrogen gas below a concentration at which it may ignite. These gas-liquid separators and/or blowers increase the capital and operating costs of the electrochlorination systems.

SUMMARY

In accordance with an aspect of the present invention, there is provided an electrochlorination system comprising an electrochemical cell including a housing having an inlet, an outlet, and an anode-cathode pair disposed within the housing, a source of a chloride-containing aqueous solution having an outlet fluidly connectable to the inlet of the electrochemical cell, and a source of an oxidizing agent fluidly connectable to the source of chloride-containing aqueous solution upstream of the electrochemical cell.

In some embodiments, the outlet of the housing of the electrochemical cell is fluidly connectable to a point of use. A disinfectant compound generated in the electrochemical cell may be fluidly connected to the point of use through the outlet of the housing.

In some embodiments, the electrochlorination system further comprises a controller configured to regulate introduction of the oxidizing agent into the chloride-containing aqueous solution based at least on one or more of a flow rate of the chloride-containing aqueous solution, a concentration of chloride in the chloride-containing aqueous solution, or an oxidation-reduction potential of a liquid in the point of use.

In some embodiments, the point of use includes one of a shipboard system, a drilling platform system, an aquatics system, a drinking water system, or a downhole of an oil drilling system. The point of use may include one of a cooling water system and a ballast tank.

In some embodiments, the source of the chloride-containing aqueous solution includes one of seawater, brackish water, or brine.

In some embodiments, the source of the oxidizing agent includes a gas separation system.

In some embodiments, the electrochlorination system further comprises an oxygenation system configured to mix the oxidizing agent with the chloride-containing aqueous solution upstream of the electrochemical cell. The oxygenation system may include one or more of an aeration vessel, a dissolved air flotation pump, a mixing vessel, or a venturi.

In some embodiments, the electrochlorination system further comprises a conduit configured to deliver the chloride-containing aqueous solution from the source of chloride-containing aqueous solution to the inlet of the housing and including an injection point for the oxidizing agent.

In some embodiments, the electrochlorination system further comprises a controller configured to regulate introduction of the oxidizing agent into the chloride-containing aqueous solution based at least on a concentration of a chlorine-based disinfectant compound generated in the electrochemical cell. The controller may be further configured to regulate the concentration of the chlorine-based disinfectant compound generated in the electrochemical cell based at least on an oxidation-reduction potential of liquid in a point of use fluidly connectable to the outlet of the housing of the electrochemical cell.

In some embodiments, the electrochlorination system further comprises a controller configured to regulate introduction of the oxidizing agent into the chloride-containing aqueous solution based at least on one or more of temperature in the electrochemical cell, pH of the chloride-containing aqueous solution, or pH of a disinfection solution generated in the electrochemical cell.

In some embodiments, the electrochlorination system further comprises a controller configured to regulate introduction of the oxidizing agent into the chloride-containing aqueous solution based at least on one or more of an amount of gaseous hydrogen present in the electrochemical cell, a concentration of hydrogen dissolved in the chloride-containing aqueous solution, a concentration of oxygen dissolved in the chloride-containing aqueous solution, or a concentration of oxygen dissolved in a disinfection solution generated in the electrochemical cell.

In some embodiments, the electrochlorination system further comprises a controller configured to regulate one or more of a current across the anode-cathode pair or a voltage applied across the anode-cathode pair based at least partially on a flow rate of the chloride-containing aqueous solution and a rate of introduction of the oxidizing agent into the chloride-containing aqueous solution.

In some embodiments, the electrochlorination system further comprises a controller configured to introduce the oxidizing agent into the chloride-containing aqueous solution in an amount sufficient to sustain electron donation to the oxidizing agent rather than to water molecules in the chloride-containing aqueous solution at a surface of a cathode of the anode-cathode pair during operation of the electrochemical cell.

In some embodiments, the electrochlorination system further comprises a controller configured to introduce the oxidizing agent into the chloride-containing aqueous solution in an amount sufficient to prevent formation of hydrogen gas in the electrochemical cell during operation of the electrochemical cell. The controller may be configured to introduce the oxidizing agent into the chloride-containing aqueous solution in an amount sufficient to prevent formation of hydrogen gas at a cathode of the anode-cathode pair during operation of the electrochemical cell.

In some embodiments, the electrochlorination system further comprises a controller configured to introduce the oxidizing agent into the chloride-containing aqueous solution in an amount approximately stoichiometric with a quantity of chlorine-based disinfectant compound produced in the electrochemical cell.

In some embodiments, the electrochlorination system further comprises a controller configured to introduce the oxidizing agent into the chloride-containing aqueous solution in an amount sufficient to provide for substantially all free hydrogen in the electrochemical cell to be oxidized.

In some embodiments, the electrochemical cell further includes one or more oxidizing agent injection points in the housing between the inlet and the outlet.

In some embodiments, the electrochlorination system is included in a feed-and-bleed system comprising a conduit fluidly connecting the outlet with the inlet.

In some embodiments, the oxidizing agent includes one or more of gaseous oxygen, air, oxygen-enriched air, ozone, or hydrogen peroxide.

In some embodiments, the anode-cathode pair is disposed substantially concentrically within the housing about a central axis of the housing and defines an active area between an anode and a cathode of the anode-cathode pair, an active surface area of at least one of the anode and the cathode having a surface area greater than a surface area of an internal surface of the housing. The anode-cathode pair may be spiral-wound about the central axis. The anode-cathode pair may include a plurality of concentric electrode tubes and gaps defined between adjacent electrode tubes.

In some embodiments, each of the anode and the cathode of the anode-cathode pair include acute portions, an active surface area of the anode being greater than a surface area of an internal surface of the housing and an active surface area of the cathode being greater than a surface area of an internal surface of the housing.

In some embodiments, each of the anode and the cathode of the anode-cathode pair extend radially outward from a region proximate a central axis of the housing, an active surface area of the anode being greater than a surface area of an internal surface of the housing, and an active surface area of the cathode being greater than a surface area of an internal surface of the housing.

In accordance with another aspect, there is provided a method of abating hydrogen in an electrochemical cell. The method comprises introducing an oxidizing agent into a chloride-containing aqueous solution to produce an oxygenated aqueous solution upstream of an inlet of the electrochemical cell, introducing the oxygenated aqueous solution into the electrochemical cell between an anode and a cathode of the electrochemical cell, and applying a current across the anode and the cathode at a voltage sufficient to generate a chlorine-based disinfection compound from the oxygenated aqueous solution in the electrochemical cell.

In some embodiments, the method further comprises controlling a rate of introduction of the oxidizing agent into the chloride-containing aqueous solution to be sufficient to suppress accumulation of substantially all hydrogen gas within the electrochlorination cell.

In some embodiments, introducing the oxidizing agent into the chloride-containing aqueous solution comprises contacting the chloride-containing aqueous solution with an oxygen-containing gas.

In some embodiments, introducing the oxidizing agent into the chloride-containing aqueous solution comprises injecting an oxygen-containing liquid into the chloride-containing aqueous solution.

In some embodiments, the method further comprises introducing the oxidizing agent into the electrochemical cell at one or more points downstream of the inlet of the electrochemical cell.

In some embodiments, the method further comprises regulating introduction of the oxidizing agent into the chloride-containing aqueous solution based at least on one or more of a flow rate of the chloride-containing aqueous solution, a flow rate of a disinfection solution out of the electrochemical cell, or a concentration of chloride in the chloride-containing aqueous solution.

In some embodiments, the method further comprises regulating introduction of the oxidizing agent into the chloride-containing aqueous solution based at least on a concentration of a chlorine-based disinfectant compound generated in the electrochemical cell.

In some embodiments, the method further comprises regulating the concentration of the chlorine-based disinfectant compound generated in the electrochemical cell based at least on an oxidation-reduction potential of a liquid in a point of use fluidly connectable to an outlet of the housing of the electrochemical cell.

In some embodiments, the method further comprises regulating introduction of the oxidizing agent into the chloride-containing aqueous solution based at least on one or more of temperature in the electrochemical cell, pH of the chloride-containing aqueous solution, or pH of a disinfection solution generated in the electrochemical cell.

In some embodiments, the method further comprises regulating introduction of the oxidizing agent into the chloride-containing aqueous solution based at least on one or more of an amount of gaseous hydrogen present in the electrochemical cell, a concentration of hydrogen dissolved in the chloride-containing aqueous solution, a concentration of oxygen dissolved in the chloride-containing aqueous solution, or a concentration of oxygen dissolved in a disinfection solution generated in the electrochemical cell.

In some embodiments, the method further comprises regulating one or more of a current across the anode-cathode pair or a voltage applied across the anode-cathode pair based a flow rate of the chloride-containing aqueous solution and a rate of introduction of the oxidizing agent into the chloride-containing aqueous solution.

In some embodiments, the method further comprises regulating introduction of the oxidizing agent into the electrochemical cell such that the oxidizing agent is introduced in an amount approximately stoichiometric with a quantity of chlorine-based disinfectant compound produced in the electrochemical cell.

In some embodiments, the method further comprises regulating introduction of the oxidizing agent into the electrochemical cell such that substantially all free hydrogen in the electrochemical cell is oxidized.

In some embodiments, introducing the oxidizing agent into the chloride-containing aqueous solution comprises introducing one or more of gaseous oxygen, ozone, air, oxygen-enriched air, or hydrogen peroxide into the chloride-containing aqueous solution.

In accordance with another aspect, there is provided a method of suppressing accumulation of gaseous hydrogen in an electrochlorination cell. The method comprises adding an oxidizing agent to a liquid electrolyte upstream of an electrolyte inlet of the electrochlorination cell.

In accordance with another aspect, there is provided a method of retrofitting an electrochlorination cell to reduce generation of hydrogen in the electrochlorination cell. The method comprises installing a system configured to introduce an oxidizing agent into electrolyte upstream of an electrolyte inlet of the electrochlorination cell.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
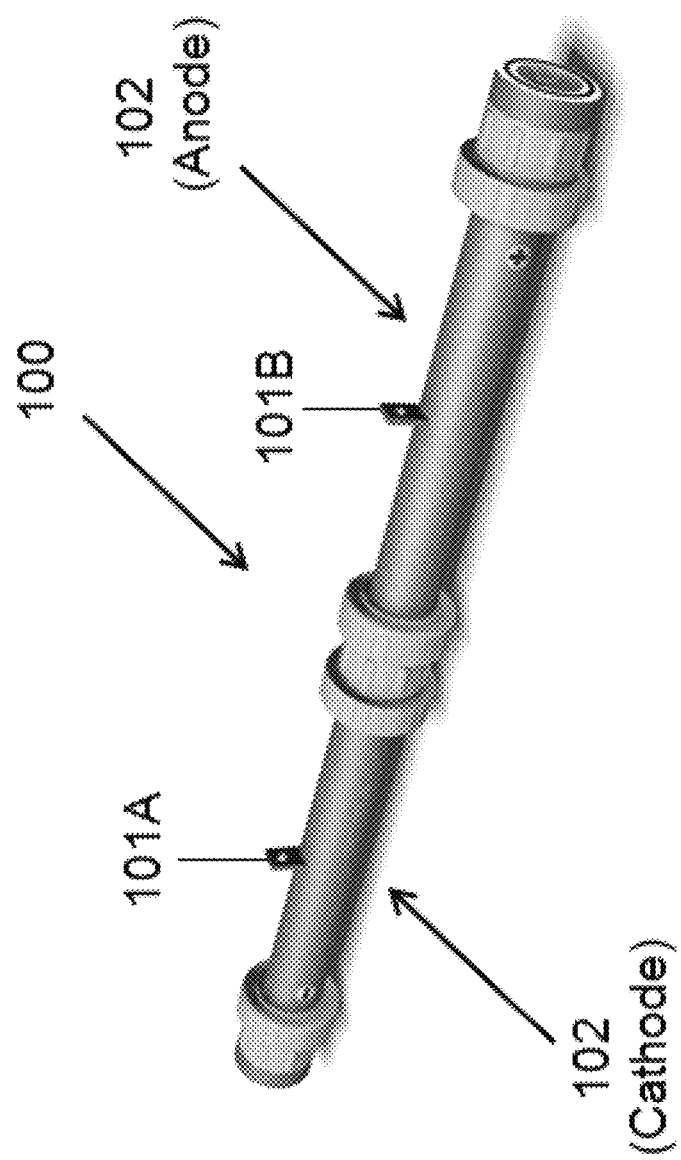
FIG. 1A is an isometric view of an embodiment of a concentric tube electrochemical cell.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein are generally directed to electrochemical devices to generate disinfectants such as sodium hypochlorite and to methods of abatement of hydrogen produced in such devices. The terms "electrochemical device" and "electrochemical cell" and grammatical variations thereof are to be understood to encompass "electrochlorination devices" and "electrochlorination cells" and grammatical variations thereof. Aspects and embodiments disclosed herein are described as including one or more electrodes. The term "metal electrodes" or grammatical variation thereof as used herein is to be understood to encompass electrodes formed from, comprising, or consisting of one or more metals, for example, titanium, aluminum, or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells disclosed herein can be formed as or from plates, sheets, foils, extrusions, and/or sinters.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis, but does not exclude tubes or interleaved spirals surrounding a common axis that is not necessarily central to each of the concentric tubes or interleaved spirals in a set of concentric tubes or interleaved spirals or tubes or interleaved spirals having axes offset from one another.

Electrochlorination cells are used in marine, offshore, municipal, industrial and commercial applications. The design parameters of electrochlorination cells, for example, inter-electrode spacing, thickness of electrodes and coating density, electrode areas, methods of electrical connections, etc., can be selected for different implementations. Aspects and embodiments disclosed herein are not limited to the number of electrodes, the space between electrodes, the electrode material, material of any spacers between electrodes, number of passes within the electrochlorination cells, or electrode coating material.

This disclosure describes various embodiments of electrochlorination cells and electrochlorination devices, however, this disclosure is not limited to electrochlorination cells or devices and the aspects and embodiments disclosed herein are applicable to electrolytic and electrochemical cells used for any one of multiple purposes.

Figure 1B:
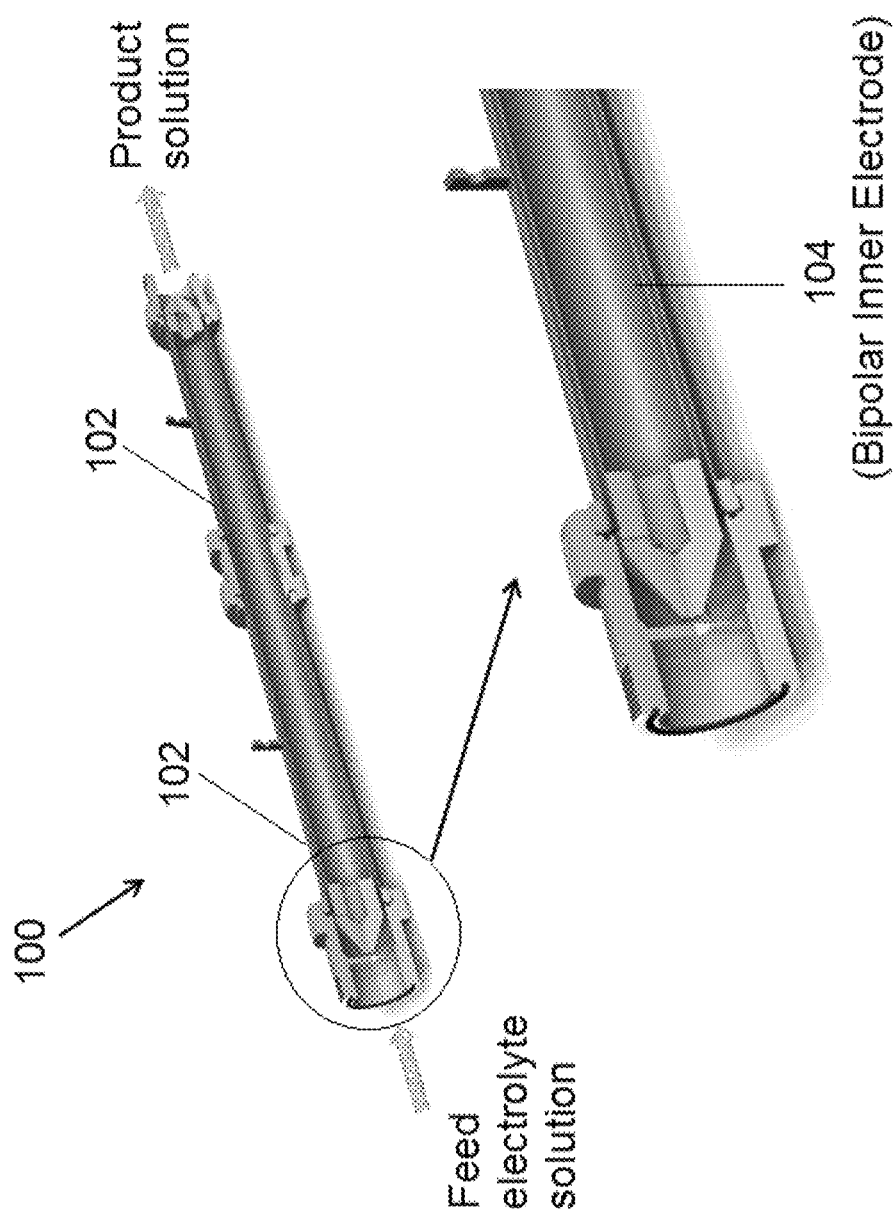
FIG. 1B is a cross-sectional view of the concentric tube electrochemical cell of FIG. 1A.

FIGS. 1A and 1B show an example of an electrochlorination cell 100 with concentric tubes 102, 104 manufactured by Electrocatalytic Ltd. The inner surface of the outer tubes 102 and the outer surface of the inner tube 104 are the active electrode areas. The gap between the electrodes is approximately 3.5 mm. For marine and offshore applications with seawater as feed, the liquid velocity in the gap in the axial direction can be on the order of 2.1 m/s, resulting in highly turbulent flow which reduces the potential for fouling and scaling on the electrode surfaces.

Figure 2A:
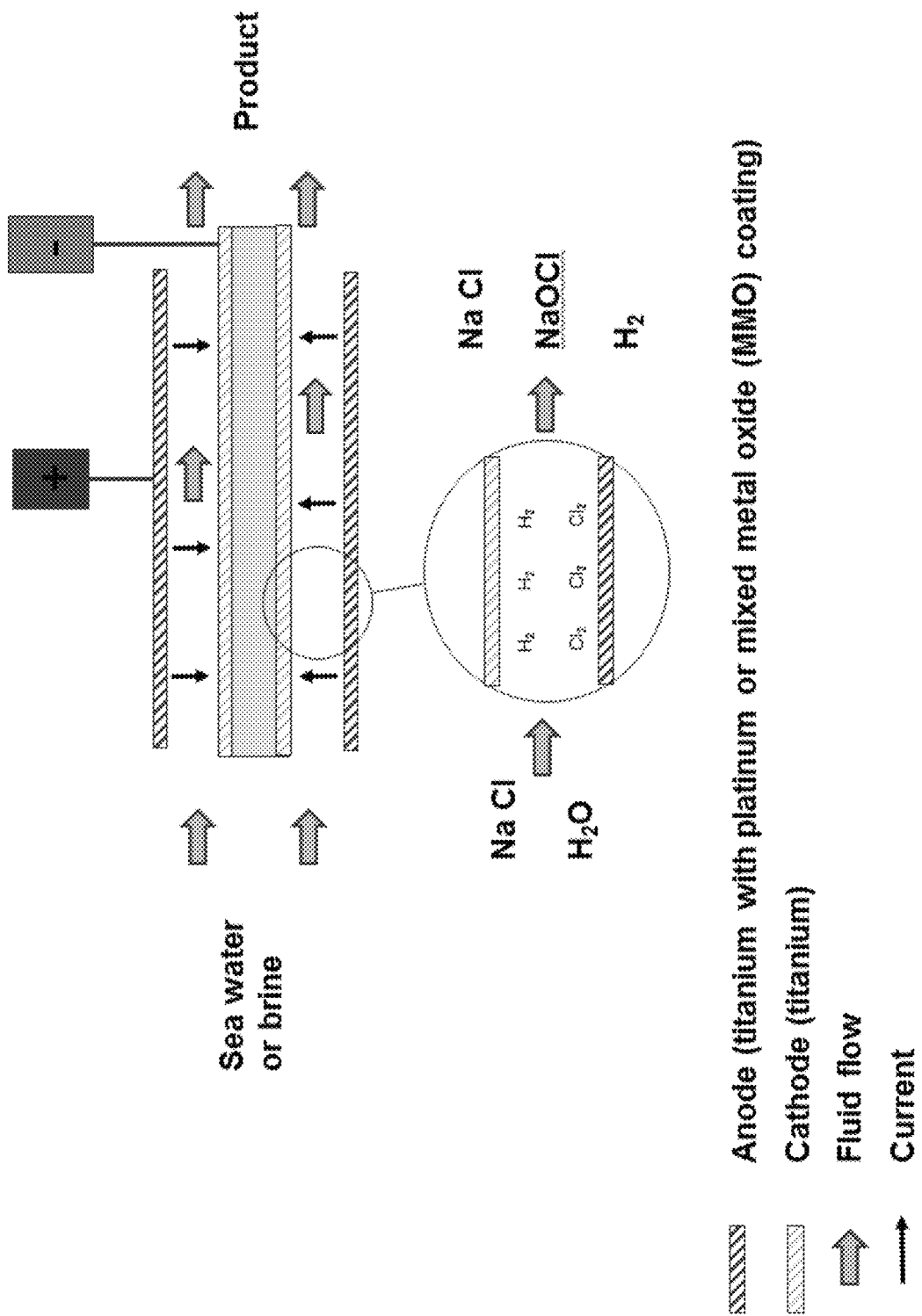
FIG. 2A illustrates current flow through an embodiment of a concentric tube electrochemical cell.
Figure 2B:
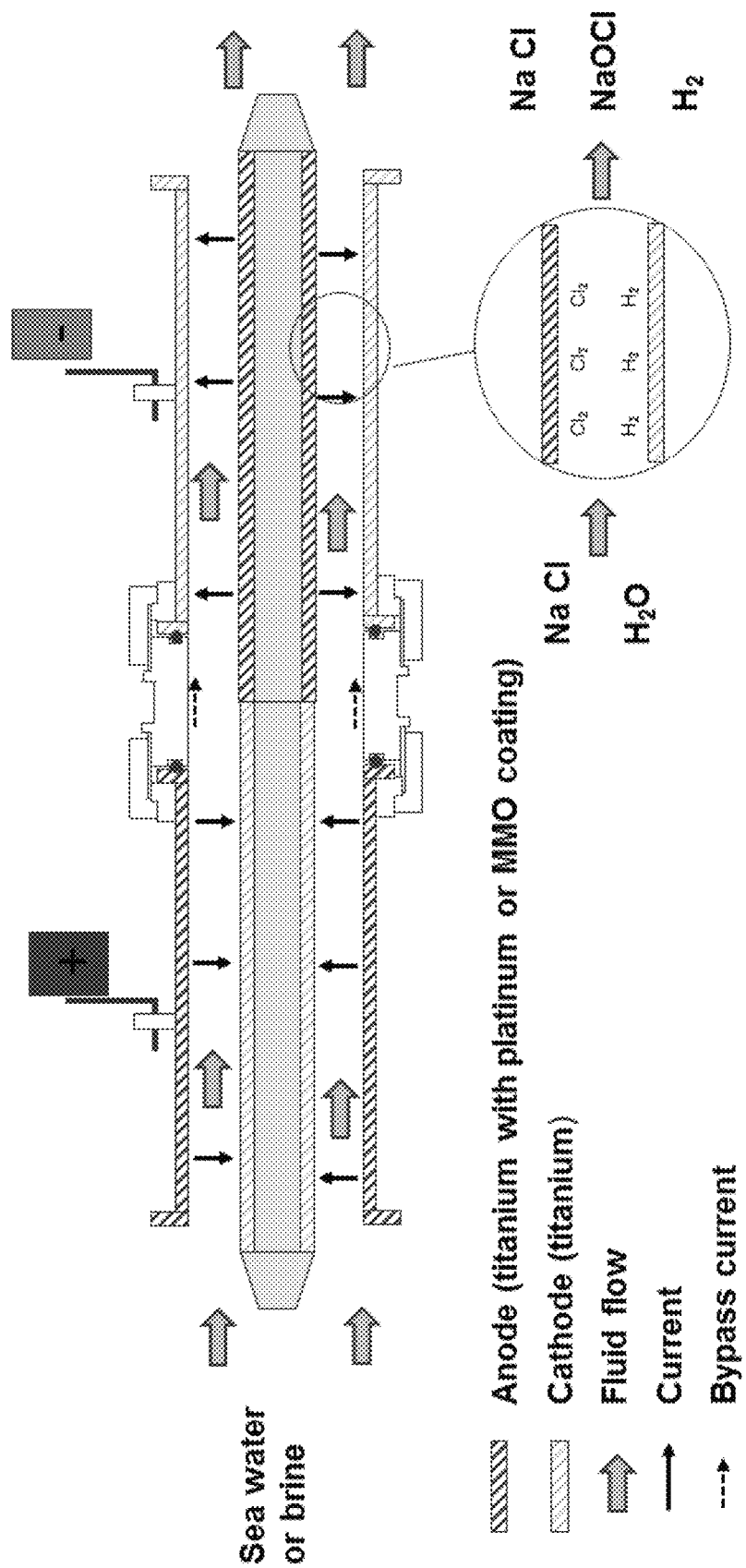
FIG. 2B illustrates current flow through another embodiment of a concentric tube electrochemical cell.
Figure 2C:
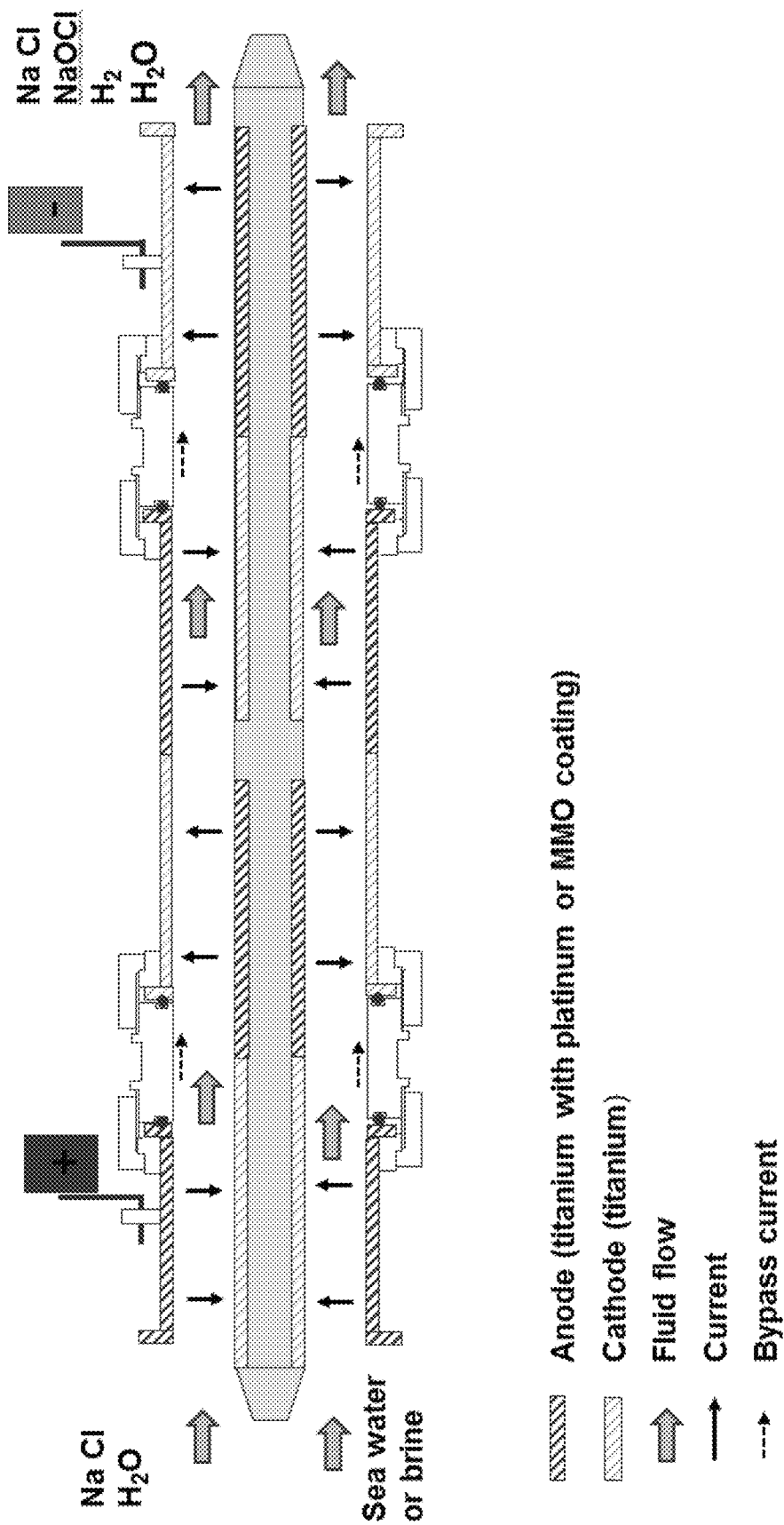
FIG. 2C illustrates current flow through another embodiment of a concentric tube electrochemical cell.

FIGS. 2A-2C show some possible arrangements of electrodes in a concentric tube electrode (CTE) electrochemical cell. FIG. 2A illustrates an arrangement in which current flows in one pass from the anode to the cathode. Both electrodes are typically fabricated from titanium, with the anode coated with platinum or a mixed metal oxide (MMO). The electrodes are called "mono-polar."

FIG. 2B illustrates an arrangement in which current flows in two passes through the device with two outer electrodes and one inner electrode. One of the outer electrodes is coated on the inside surface to serve as an anode; the other is uncoated. A portion of the outer surface of the inner electrode is coated, also to serve as an anode, and the remaining portion is uncoated. Current flows through the electrolyte from the coated outer electrode to the uncoated portion of the inner electrode, along the inner electrode to the coated portion, then finally back across the electrolyte to the uncoated outer electrode. The inner electrode is also called a "bipolar" electrode.

FIG. 2C illustrates an arrangement in which current flows in multiple passes through the device with multiple outer electrodes and one inner electrode. By alternating coated and uncoated outer electrodes and coating the inner electrodes at matching intervals, current can flow back and forth through the electrolyte in multiple passes.

The rationale behind multiple passes is that the overall electrode area available for electrochemical reaction at the surface, and therefore the overall production rate of disinfectant (e.g., sodium hypochlorite), can be increased without a proportional increase in applied current. Increasing the electrical current would require larger wires or bus bars from the DC power supply to the electrochlorination cell, larger electrical connectors on the cell (lugs 101A and 101B on the outside surface of the outer electrode in the example in FIG. 1A) and thicker titanium for the electrodes.

For the same current, a multiple pass device will have a higher production rate than a single pass cell but the overall voltage drop will be higher (approximately proportional to the number of passes). For the same production rate, a multiple pass cell will require lower current (approximately inversely proportional to the number of passes). For the same power output (kW), power supply costs may be more sensitive to output current than output voltage, thereby favoring the multi-pass cells.

In actuality there are inefficiencies associated with a multiple pass cell. For example, a portion of the current, referred to as "bypass current," can flow directly from an anode to a cathode without crossing the electrolyte in the gap between the outer and inner electrodes (see FIGS. 2B and 2C). The bypass current consumes power but results in less efficient production of the disinfectant than non-bypass current. Multiple pass cells are also more complex to fabricate and assemble. Portions of the outer surface of the inner electrode, for example, must be masked before the remaining portions are coated.

Figure 3:
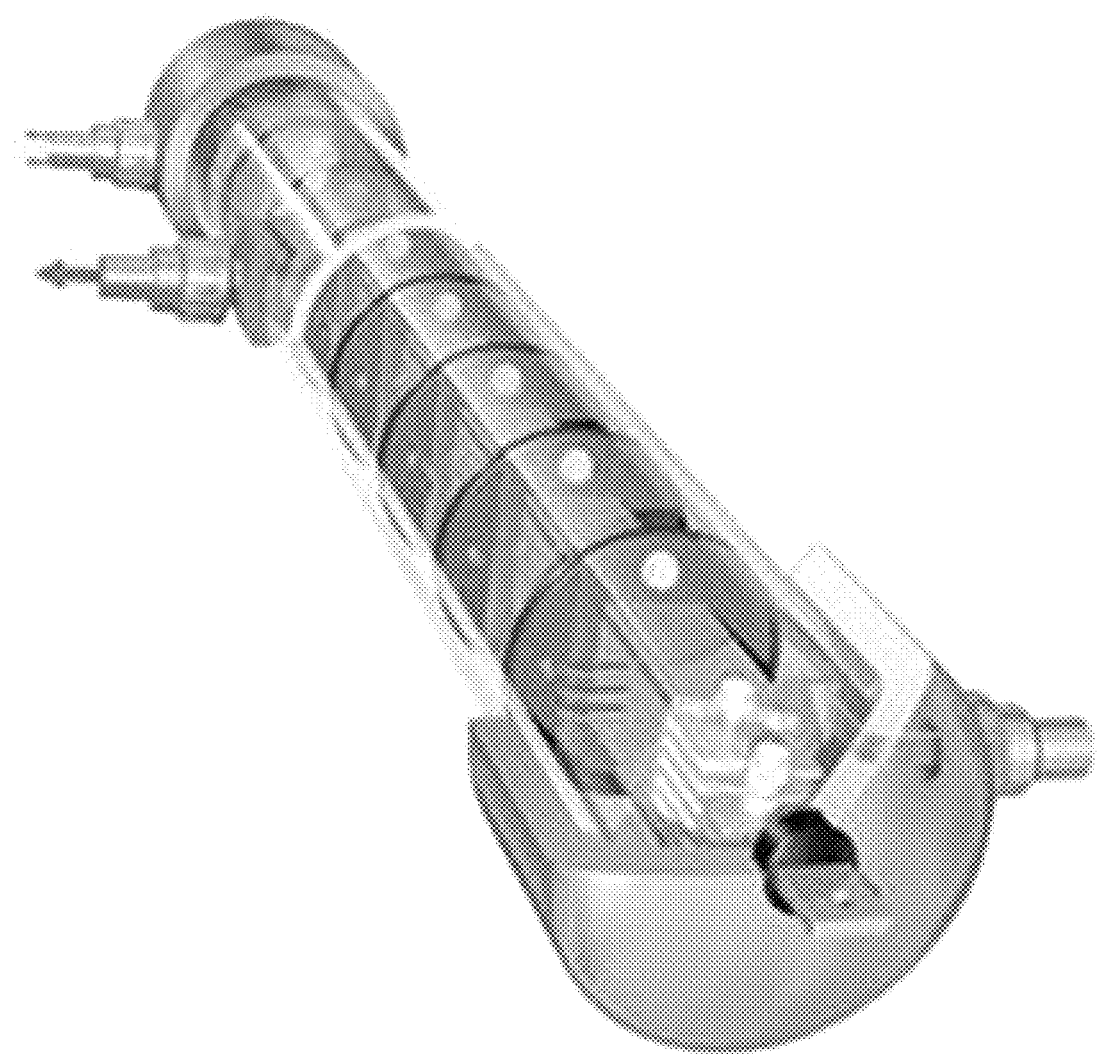
FIG. 3 is an isometric view of an embodiment of a parallel plate electrochemical cell.
Figure 4:
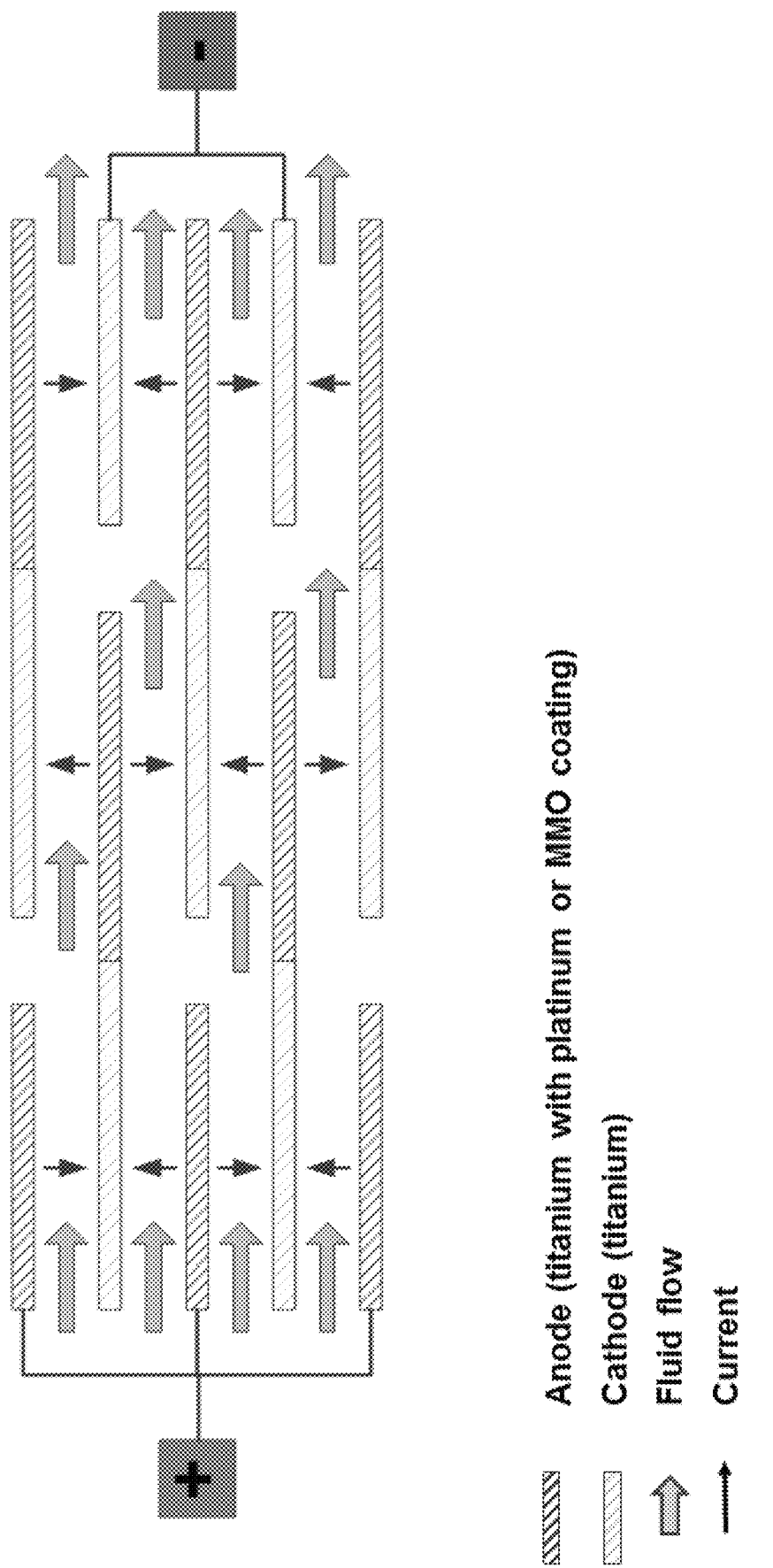
FIG. 4 is a schematic of a multiple-pass parallel plate electrochlorination cell.

FIG. 3 shows a parallel plate electrochlorination (PPE) cell and FIG. 4 is a schematic of a multiple-pass unit with sets of flat electrodes arranged in parallel. The sets of electrodes at each end are electrically connected in parallel, with one set connected to a positive output from a DC power supply and other set connected to the negative output. The electrodes in between are bipolar. One advantage of the multiple pass parallel plate design vs. the concentric tubular design is the higher packing density of active electrode area per unit volume of the device, since both sides of each electrode are exposed to the electrolyte solution and therefore participate in electrode reactions. The tighter packing and multiple passes result in higher pressure drop in the PPE cell than in the CTE cell. The mean flow velocity between the plates can be reduced to lower the pressure drop and increase hydraulic residence time; the downside is increase in risk of fouling and scaling and therefore more frequent cleaning with acid, for example.

A frame structure is often utilized in a PPE cell to mechanically support the multiple plates and maintain a specified spacing between adjacent electrodes. Electrical connection to multiple plates at each end may also be challenging.

Figure 5:
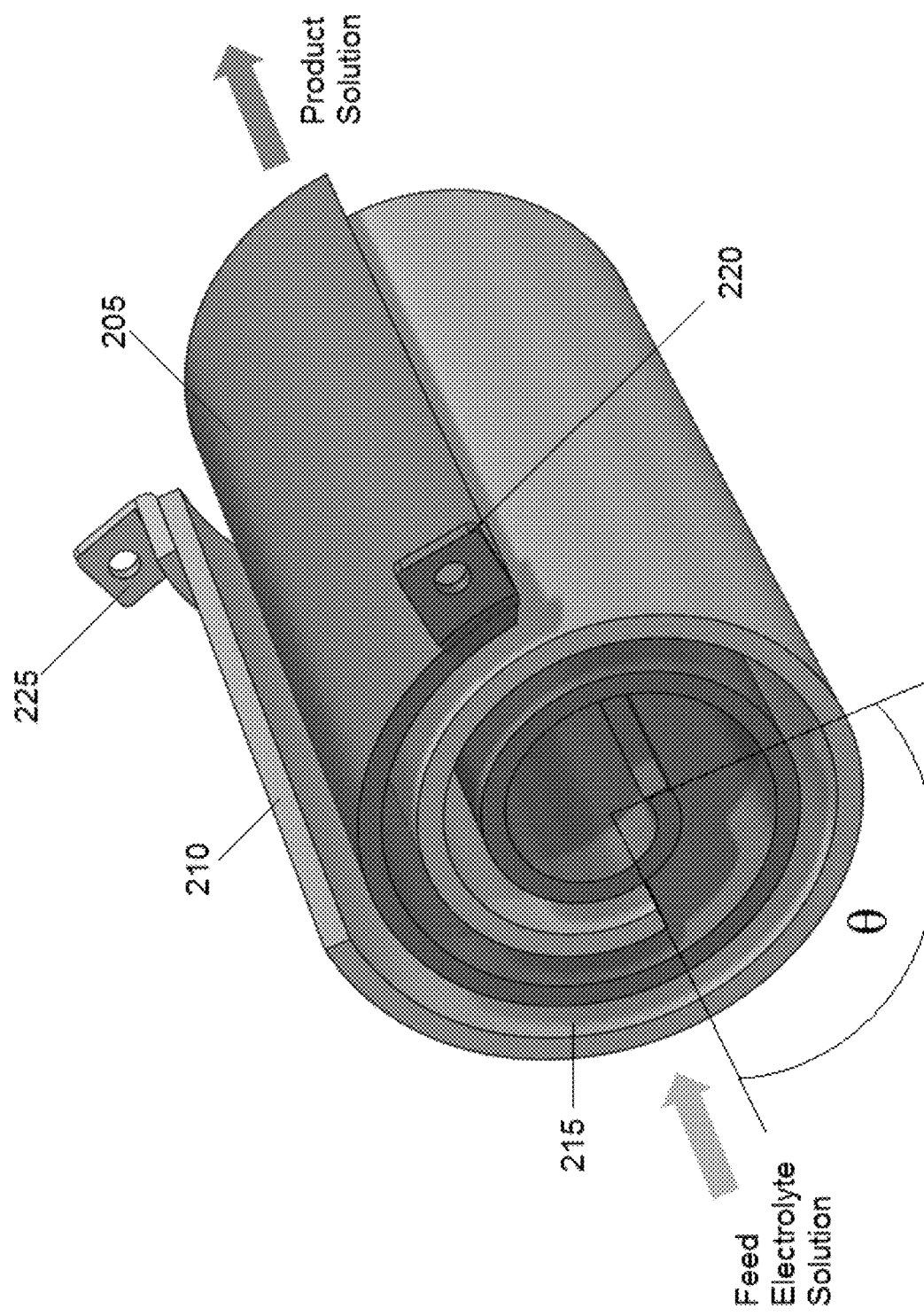
FIG. 5 is an isometric view of an embodiment of a single pass spiral wound electrochemical cell.
Figure 6:
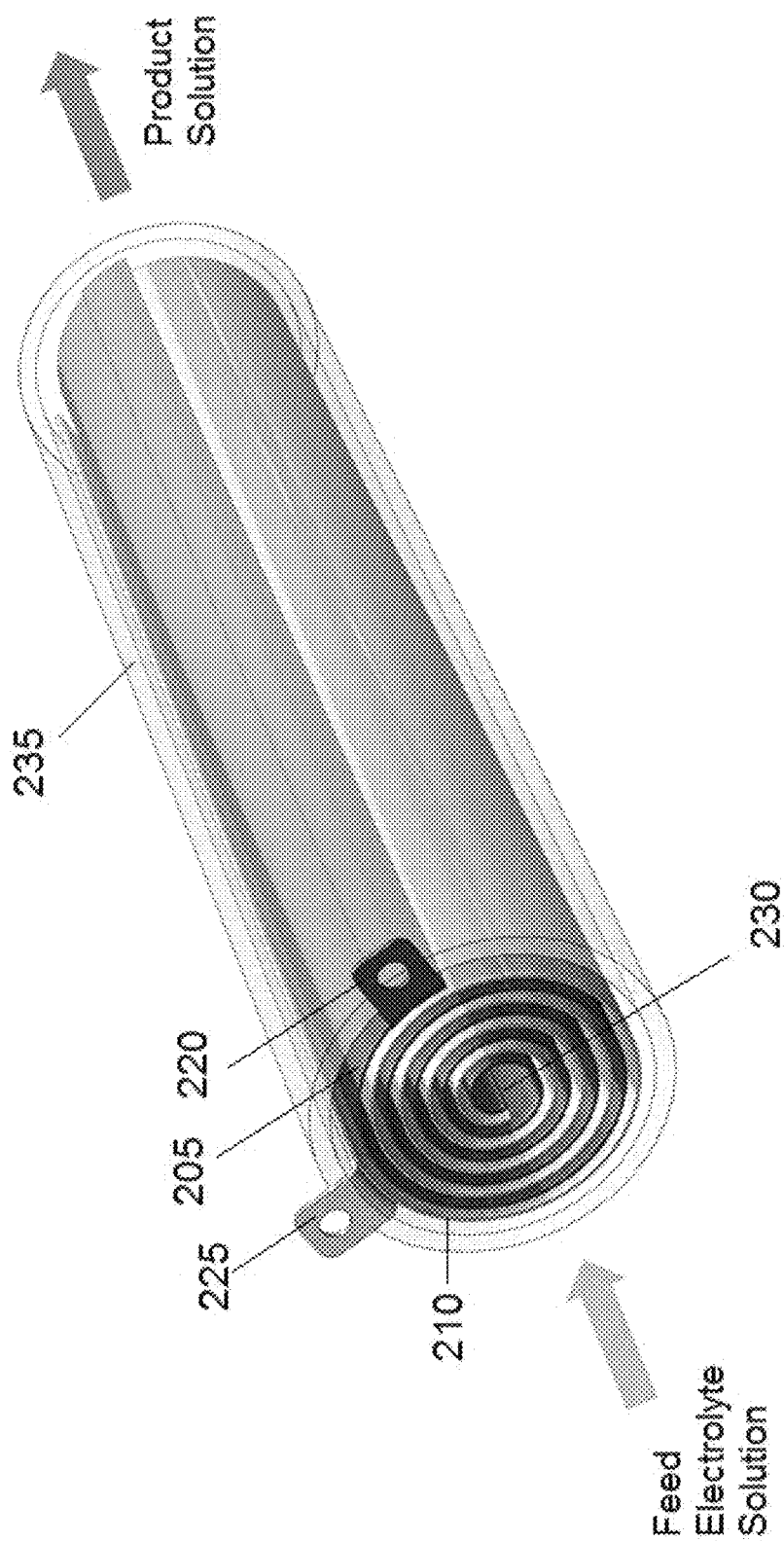
FIG. 6 is an isometric view of another embodiment of a single pass spiral wound electrochemical cell.

Aspects and embodiments disclosed herein may be applied to electrochemical cells including spiral wound electrodes, non-limiting example of which are illustrated in FIGS. 5 and 6. In spiral wound configurations, two spiral-wound electrodes, an anode 205 and a cathode 210 forming an anode-cathode pair, are positioned to form a gap 215 in between the anode 205 and cathode 210. The angular difference between the starting ends of the helices and/or the ending ends of the helixes, labeled θ in FIG. 5, may range from 0° to 180°. A feed electrolyte solution flows through the gap 215 in a direction substantially parallel to the axes of the spirals. A DC voltage, constant or variable, or in some embodiments, AC current, is applied across the electrodes and through the electrolyte solution. An anode tab 220 and a cathode tab 225 are connected to or formed integral with the anode 205 and cathode 210, respectively, to provide electrical connection to the anode 205 and cathode 210. The current flows from the anode 205 to the cathode 210 in a single pass. Electrochemical and chemical reactions occur at the surfaces of the electrodes and in the bulk electrolyte solution in the electrochemical cell to generate a product solution.

The spiral wound electrodes 205, 210 may be housed within a housing 235 (See FIG. 6) designed to electrically isolate the electrodes from the outside environment and to withstand the fluid pressure of electrolyte passing through the electrochemical cell. The housing 235 may be non-conductive, chemically non-reactive to electrolyte solutions, and may have sufficient strength to withstand system pressures. In some embodiments, a solid core, central core element, or fluid flow director that prevents fluid from flowing down the center and bypassing the gap may be provided.

Figure 7:
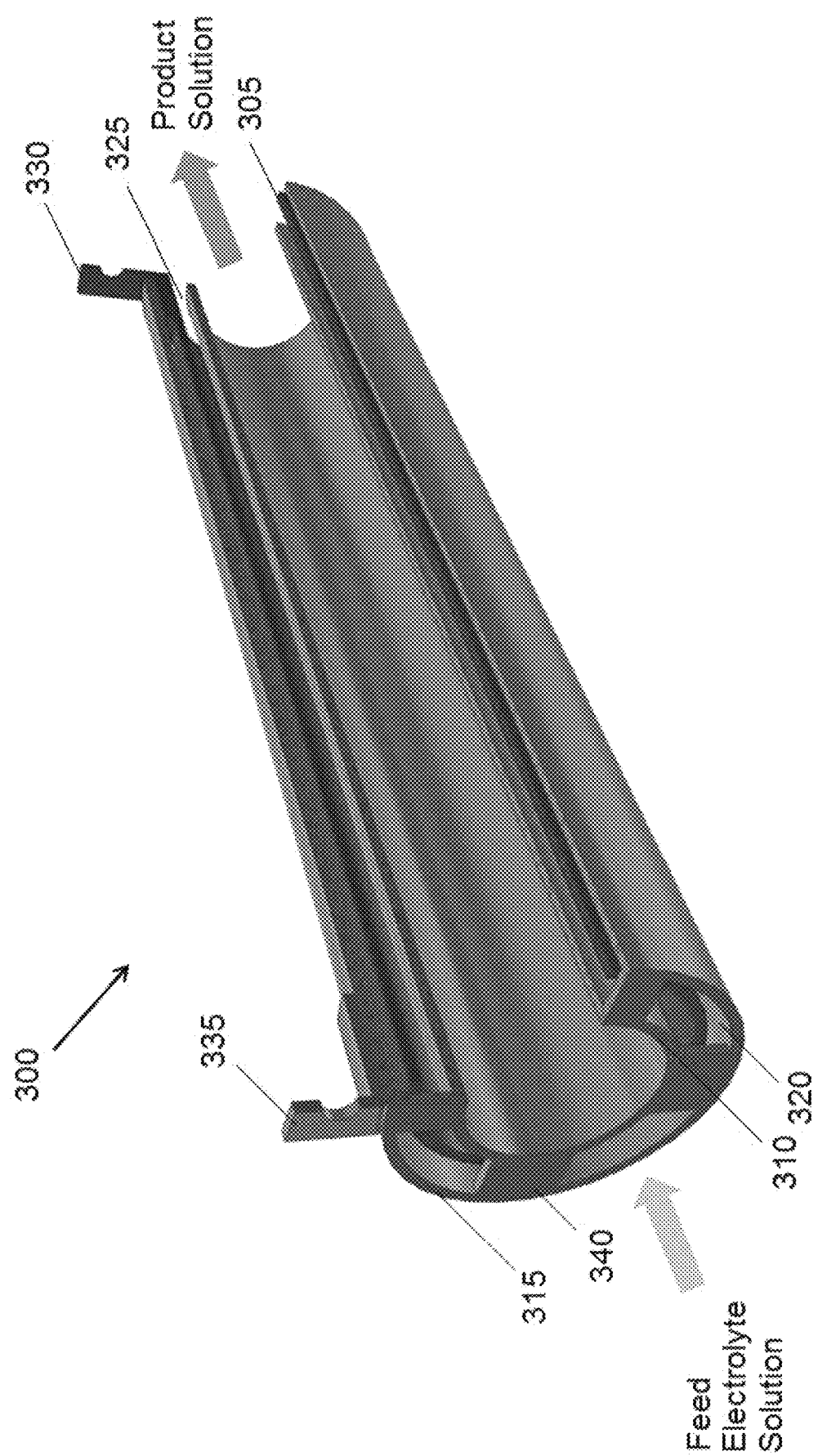
FIG. 7 is a partial cross-sectional view of an embodiment of a three tube concentric tube electrochemical cell.
Figure 8:
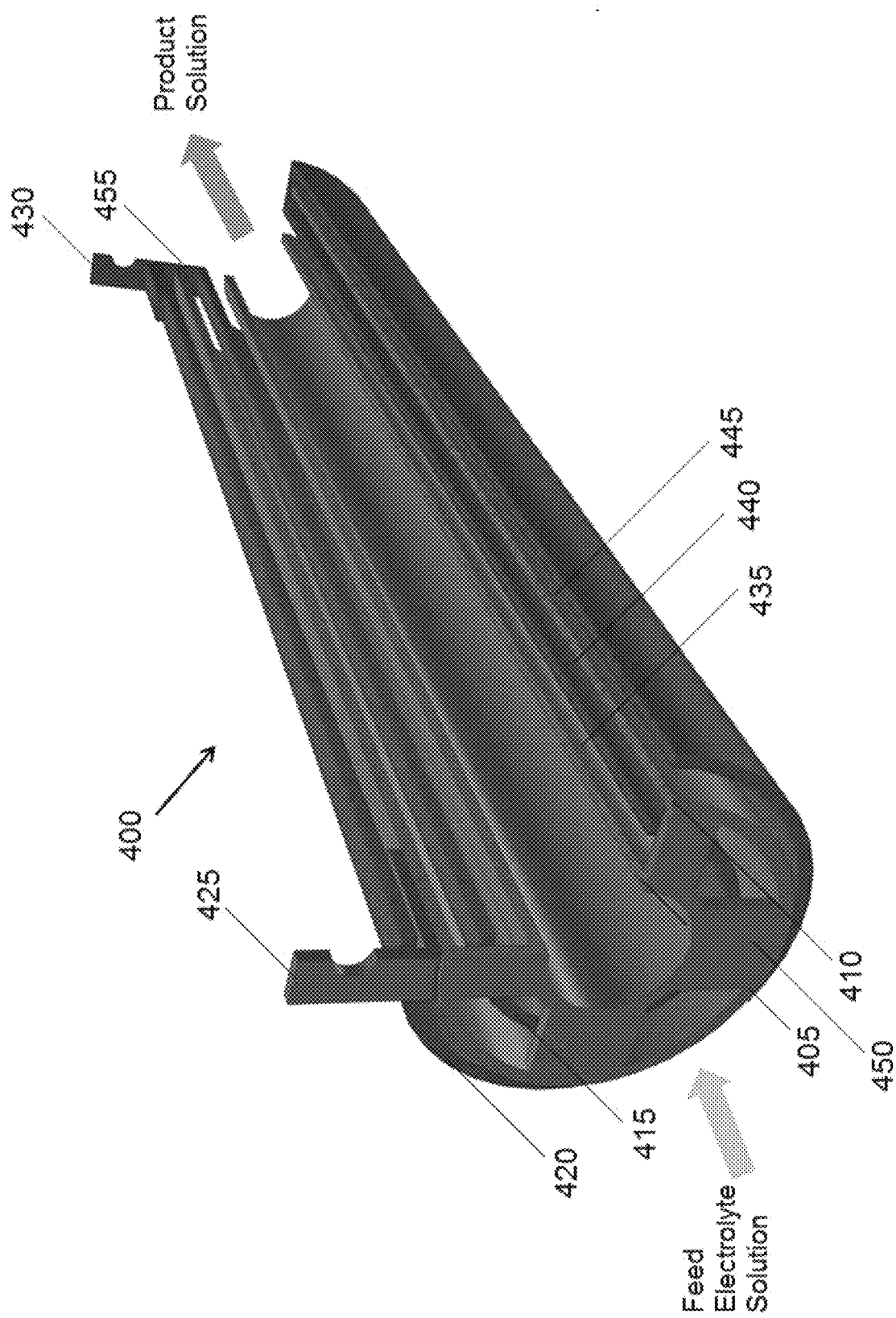
FIG. 8 is a partial cross-sectional view of an embodiment of a four tube concentric tube electrochemical cell.
Figure 9:
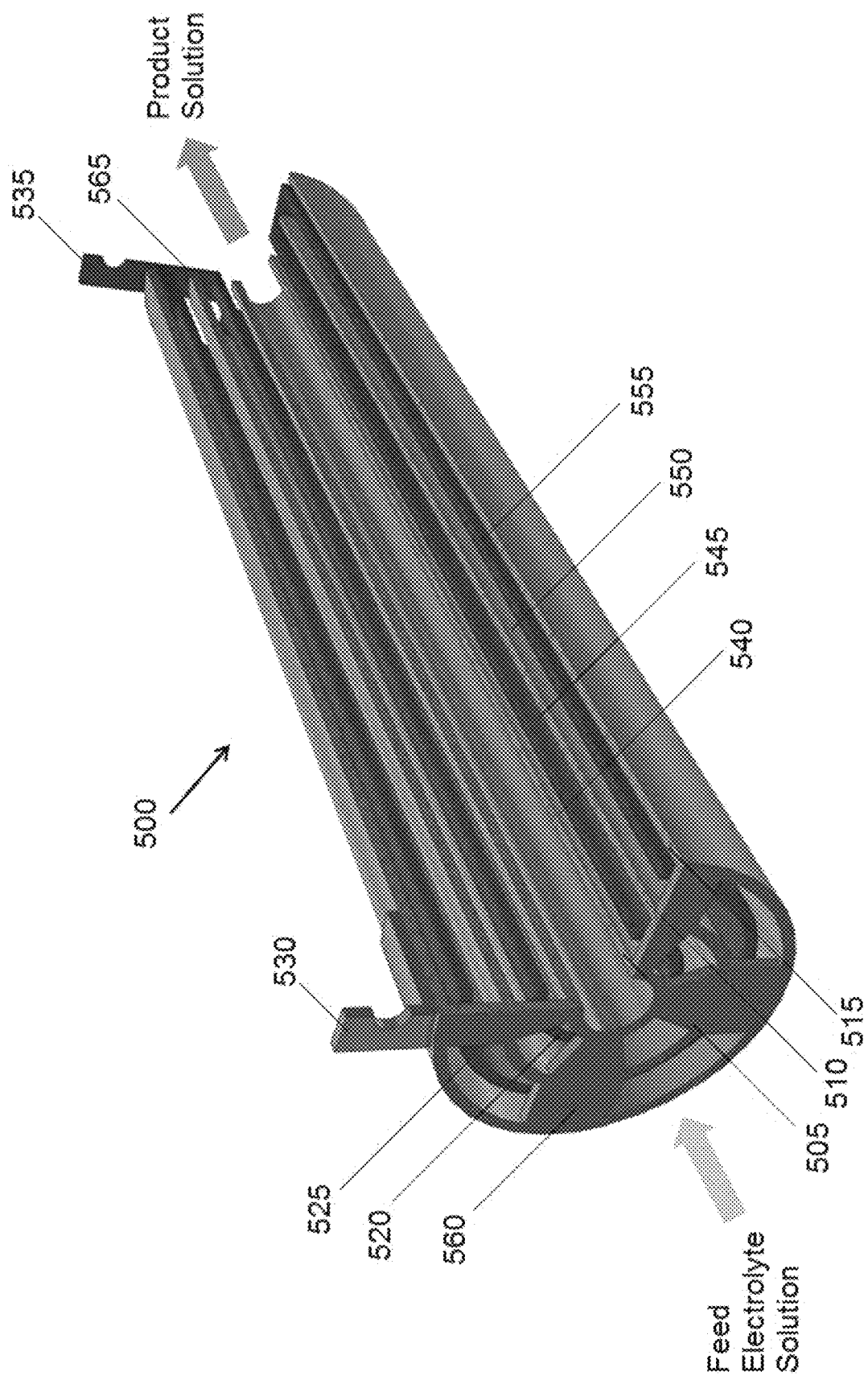
FIG. 9 is a partial cross-sectional view of an embodiment of a five tube concentric tube electrochemical cell.

Aspects and embodiments disclosed herein may be applied to electrochemical cells including concentrically arranged tubular electrodes, non-limiting examples of which are illustrated in FIGS. 7-9. At least some of the concentric tube electrodes may be mono-polar or bi-polar. A first embodiment, including three concentric tubes, is illustrated in FIG. 7 indicated generally at 300. The middle tube electrode 305 is an anode having an oxidation resistant coating, for example, platinum or MMO, on both the inner and outer surface to make full use of the surface area of the middle tube electrode 305. The inner tube electrode 310 and outer tube electrode 315 have no coating, acting as an inner cathode and an outer cathode, respectively. The electrodes are mono-polar such that current passes through the electrolyte once per electrode. Each of the electrodes 305, 310, 315 may include a titanium tube. The anode electrical connection 330 is in electrical communication with the middle tube electrode 305. The cathode electrical connection 335 is in electrical communication with the inner tube electrode 310 and outer tube electrode 315. Electrochlorination cell 300 and other electrochemical cells including concentric tube electrodes disclosed herein may be included in a non-conductive housing, for example, housing 235 illustrated in FIG. 6.

In embodiments disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments including multiple anode and/or multiple cathode tube electrodes, the multiple anode tube electrodes and/or multiple cathode tube electrodes may be collectively referred to herein as an anode-cathode pair.

Electrical connection may be made between the inner tube electrode 310 and outer tube electrode 315 by one or more conductive bridges 340, which may be formed of the same material as the inner tube electrode 310 and outer tube electrode 315, for example, titanium. Electrochemical and chemical reactions occur at the surfaces of the electrodes and in the bulk solution to generate a product solution, for example, sodium hypochlorite for disinfection.

In accordance with another embodiment, a concentric tube electrochemical or electrochlorination cell includes four concentric tube electrodes. An example of a four tube electrochlorination cell is shown in FIG. 8, indicated generally at 400. The four tube electrochlorination cell 400 includes inner tube electrode 405 and intermediate tube electrode 410 that act as anodes and that may be in electrical communication with anode electrical connector 425. Inner tube electrode 405 and intermediate tube electrode 410 may also be in electrical communication with one another via one or more conductive bridges 450. Outer tube electrode 420 and intermediate tube electrode 415 act as cathodes that may be in electrical communication with cathode electrical connector 430. Outer tube electrode 420 and intermediate tube electrode 415 may also be in electrical communication with one another via one or more conductive bridges 455. Outer tube electrode 420 and intermediate tube electrode 415 are disposed on opposite sides of intermediate anode tube electrode 410. The four tube electrochlorination cell 400 works in a similar way to the three tube electrochlorination cell 300, except that a feed electrolyte solution flows through the three annular gaps 435, 440, 445 formed in the four tube electrochlorination cell 400.

In accordance with another embodiment, a concentric tube electrochlorination cell includes five concentric tube electrodes. An example of a five tube electrochlorination cell is shown in FIG. 9, indicated generally at 500. The five tube electrochlorination cell 500 includes intermediate tube electrodes 520 and 525 that act as anodes and that may be in electrical communication with anode electrical connector 535. Intermediate tube electrodes 520, 525 may also be in electrical communication with one another via one or more conductive bridges 565. Inner tube electrode 505, center tube electrode 510, and outer tube electrode 515 act as cathodes that may be in electrical communication with cathode electrical connector 530. Inner tube electrode 505, center tube electrode 510, and outer tube electrode 515 may also be in electrical communication with one another via one or more conductive bridges 560. Intermediate tube electrodes 520, 525 are disposed on opposite sides of center anode tube electrode 510. The five tube electrochlorination cell works in a similar way to the four tube electrochlorination cell 400, except a feed electrolyte solution flows through the four annular gaps 540, 545, 550, 555 formed in the five tube electrochlorination cell.

Figure 10A:
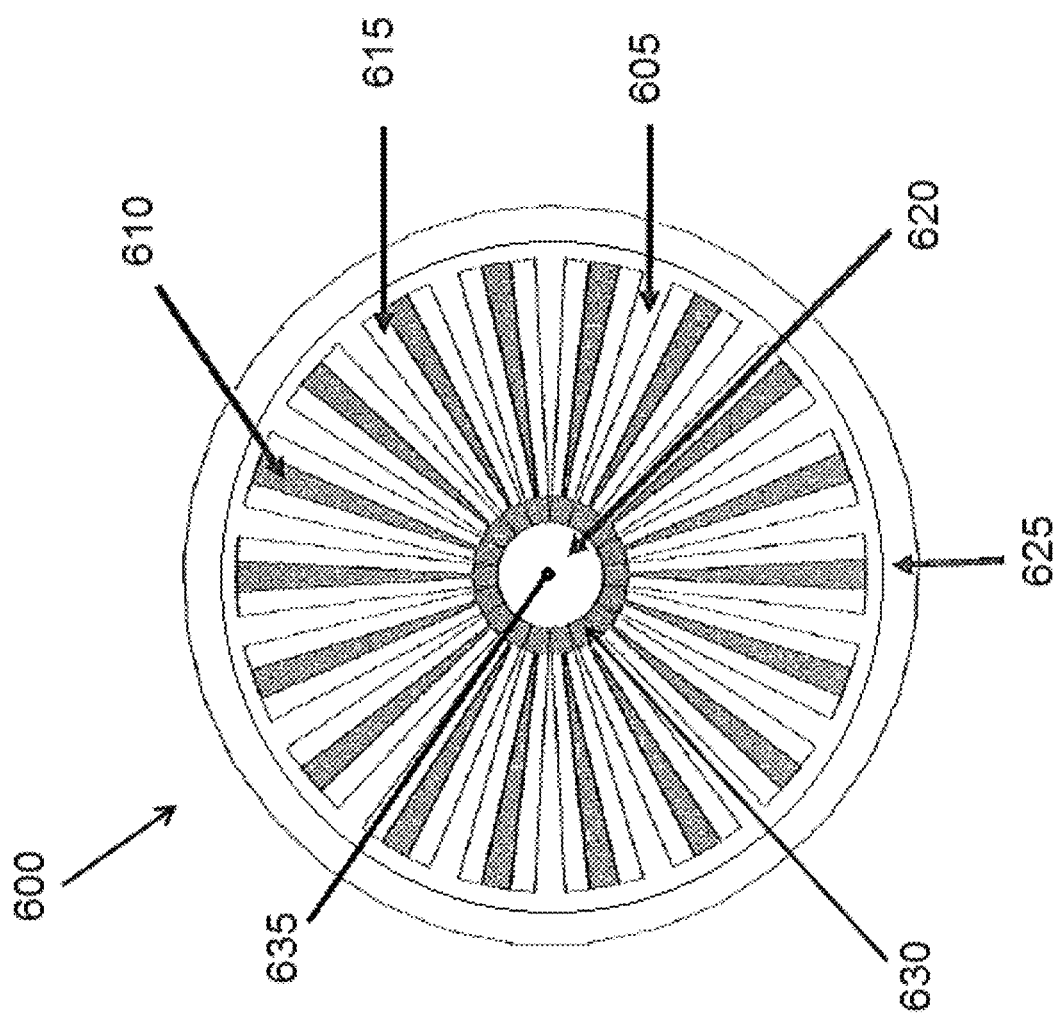
FIG. 10A is a cross-sectional view of an embodiment of an electrochemical cell including radially arranged electrodes.
Figure 10B:
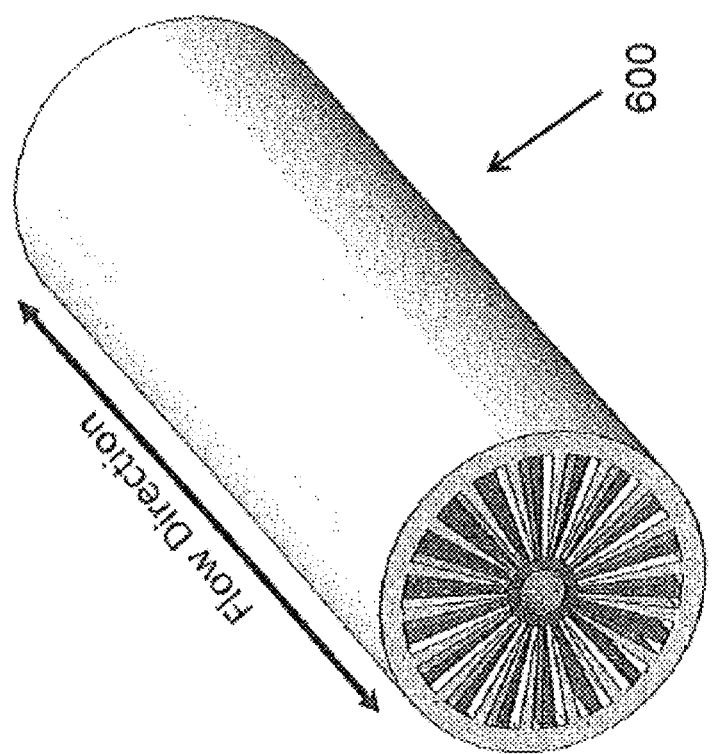
FIG. 10B is an isometric view of the electrochemical cell of FIG. 10A.

Aspects and embodiments disclosed herein may be applied to electrochemical cells including radially arranged electrodes, a non-limiting example of which is illustrated in FIGS. 10A and 10B. FIGS. 10A and 10B depict one representative, non-limiting embodiment of an electrochemical or electrochlorination cell including radially extending electrodes, indicated generally at 600. The electrochemical cell 600 includes a plurality of radially extending anodes 605 separated from radially extending cathodes 610 by fluid channels 615. The radially extending anodes 605 and radially extending cathodes 610 extend from a region 630 defined proximate to and about a central axis 635 of the electrochemical cell 600 toward an outer periphery or housing of the electrochemical cell. In some embodiments some or all of the anodes 605 are rigid metal electrodes, for example, titanium electrodes that may be coated with an oxidation resistant coating, for example, MMO or platinum. In some embodiments some or all of the cathodes 610 are rigid metal electrodes, for example, titanium electrodes or, in other embodiments, porous gas diffusion cathodes that facilitate hydrogen abatement. In some embodiments some or all of the anodes 605 may be gas diffusion anodes. In some embodiments, electrochemical or electrochlorination cells including radially extending electrodes as disclosed herein may include one or more bipolar electrodes.

A central gas conduit 620 may be provided for oxygen delivery so that the oxygen may combine with hydrogen produced by, for example, electrochlorination reactions in the cell 600 to produce water. In some embodiments, a catalyst is provided, for example, on and/or in the cathodes 610 to facilitate reaction of oxygen and hydrogen in the cell 600. A non-conductive external shell 625 may house the radially extending anodes 605, radially extending cathodes 610, fluid channels 615, and central conduit 620. The electrode surface area to volume ratio could be manipulated through selection of factors such as electrode thickness, inter-electrode spacing, as well as overall cell size.

Fluid, for example, electrolyte undergoing treatment in the cell 600 may flow through the fluid channels in a direction substantially parallel to the central conduit 620 and central axis 635. In some embodiments of electrochemical cells including radially extending anodes 605 and radially extending cathodes 610 as disclosed herein, the radially extending anodes 605 and the radially extending cathodes 610 are configured and arranged to direct the flow of some or all fluid through fluid channels defined between adjacent radially extending anodes 605 and radially extending cathodes 610 in a direction parallel, or at least substantially parallel to a central longitudinal axis of the electrochemical cell.

Aspects and embodiments disclosed herein may further be applied to electrochemical cells including interleaved electrodes, non-limiting examples of which are illustrated in FIGS. 11A-11F. An electrochlorination cell, indicated generally at 700 in FIGS. 11A and 11B includes a cathode 705 with a plurality of parallel plates 705A electrically and mechanically coupled to an arcuate base 705B and an anode 710 with a plurality of parallel plates 710A electrically and mechanically coupled to an arcuate base 710B. The parallel plates 705A of the cathode 705 are interleaved with the parallel plates 710A of the anode 710. As in the other embodiments disclosed herein the anode 710 and/or cathode 705 may be titanium and the anode 710 may be coated with an oxidation resistant coating, for example, platinum or MMO. The anode 710 and/or cathode 705 may be formed by extrusion. The cathode 705 and anode 710 are disposed in a cylindrical or substantially cylindrical vessel, 715, which, in some embodiments, is formed from non-conductive material. Electrical connections may be made to the anode 710 and cathode 705 in accordance with any of the electrical connection mechanisms described above. Spacers may be provided between the plates of the anode 710 and cathode 705 to maintain a fixed separation between the plates. Active areas of the anode 705 and cathode 710 include the parallel plates 705A of the cathode 705 and the parallel plates 710A of the anode 710, as well as, in some embodiments, the arcuate bases 705B, 710B of the cathode 705 and anode 710. Flow of fluid is through the vessel 715 in the direction indicated in FIG. 11B, generally normal to the direction of the extension of the plates of the anode 710 and cathode 705 from their respective base portions. The active areas of the anode 705 and cathode 710 extend across substantially the entirety of the cross section of the vessel 715 leaving only sufficient spacing from edges of the vessel 715 such that the anode 705 and cathode 710 do not contact and electrically short to one another. The arcuate bases 705B, 710B may span arcs of just less than 180°, for example, between about 165° and about 175° to provide a large amount of active electrode area. The electrochlorination cell 700 thus includes a greater active electrode area per unit volume than conventional parallel plate electrochlorination devices and may operate to produce an equivalent amount of chlorination with a lower overall volume.

Figure 11A:
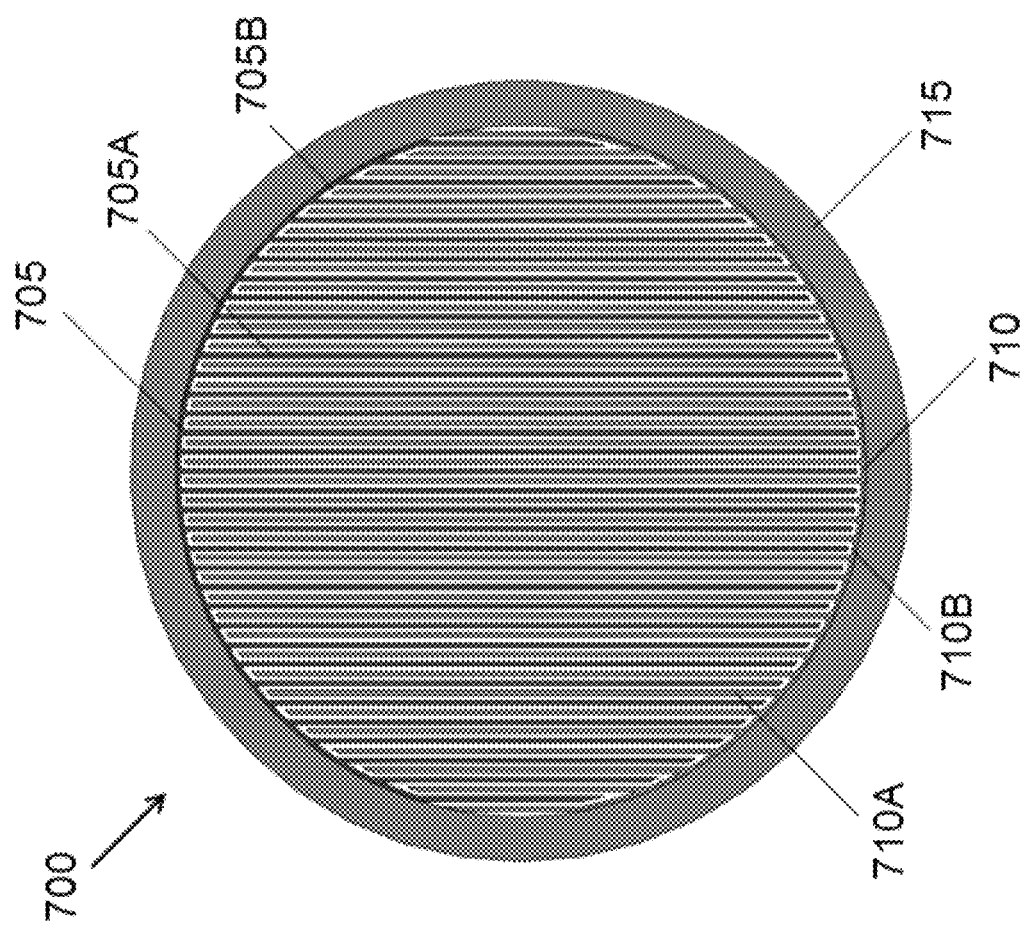
FIG. 11A illustrates a cross section of an embodiment of an electrochemical cell including interleaved electrodes.
Figure 11B:
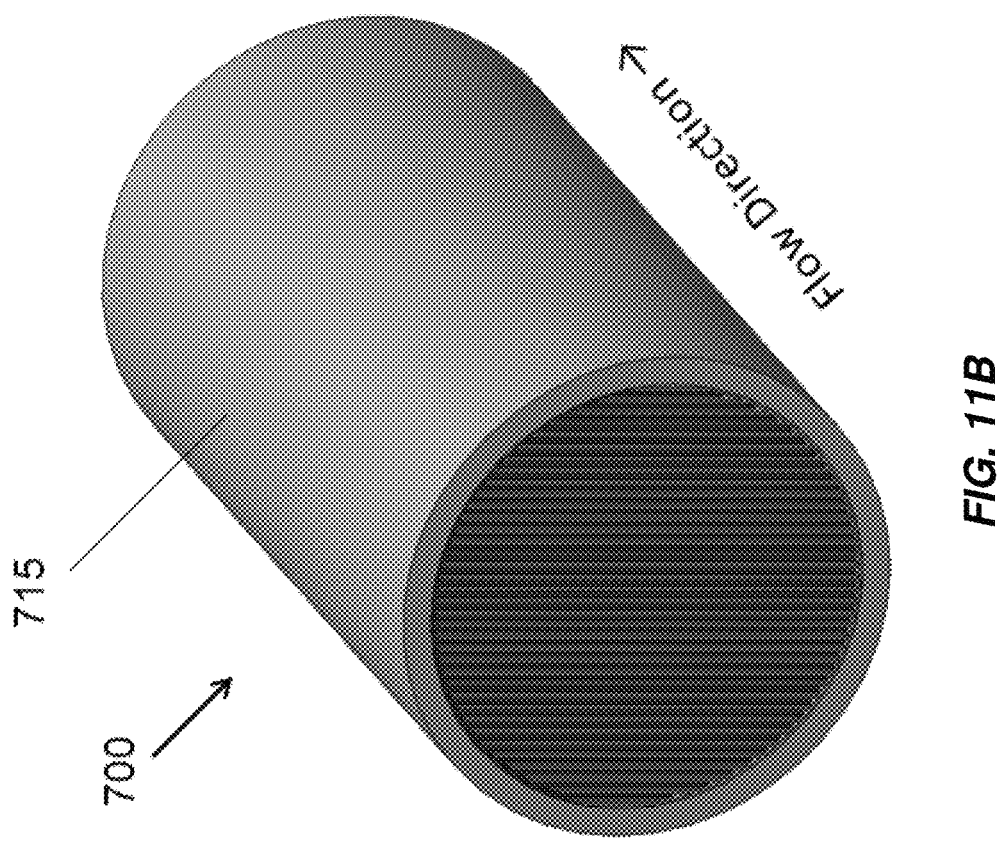
FIG. 11B illustrates a flow direction of fluid through the electrochemical cell of FIG. 11A.
Figure 11C:
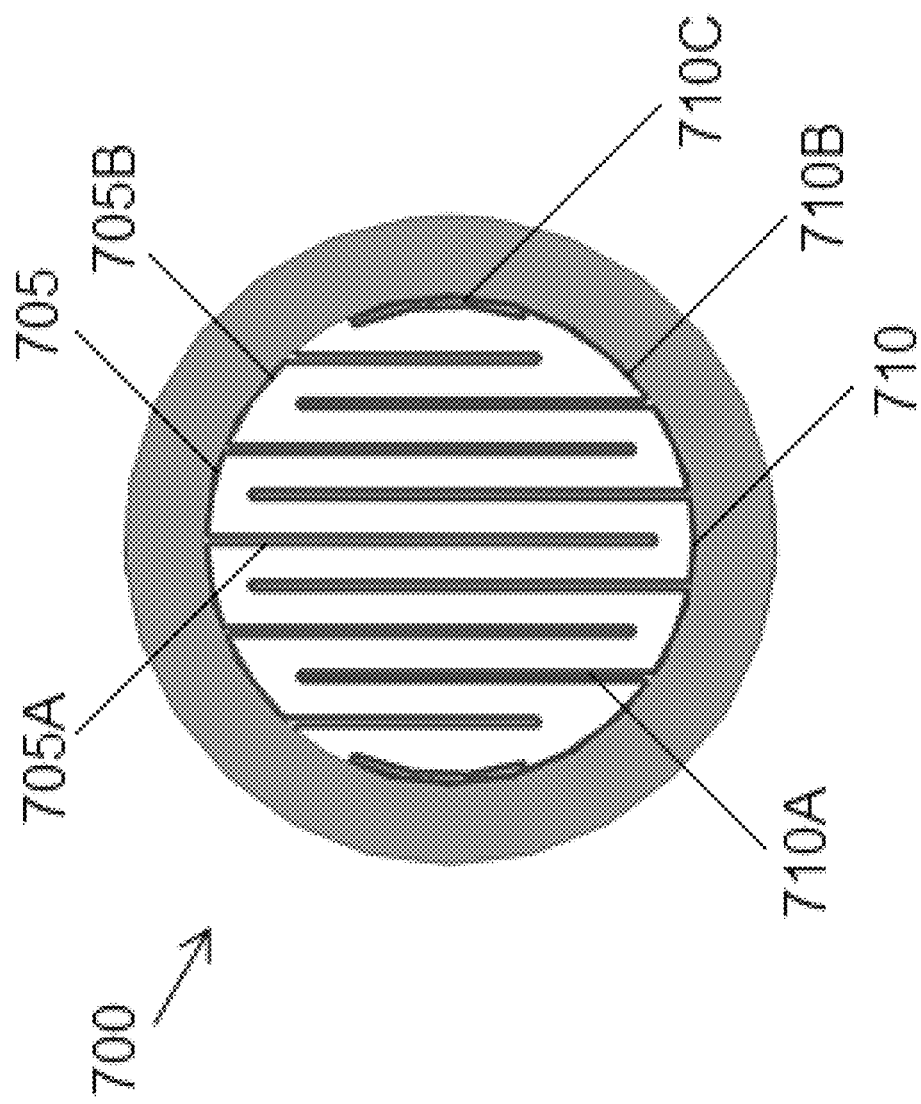
FIG. 11C illustrates an alternate configuration of the electrochemical cell of FIG. 11A.
Figure 11D:
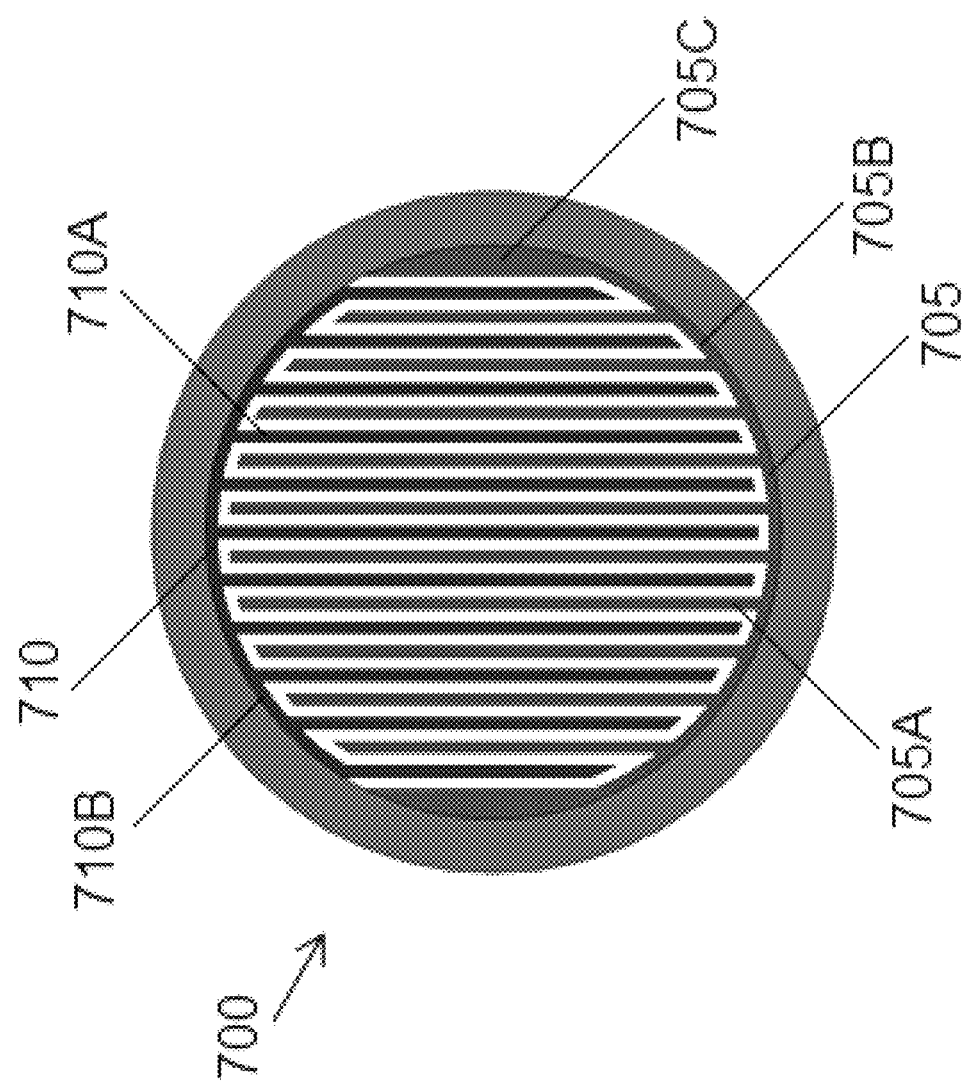
FIG. 11D illustrates another alternate configuration of the electrochemical cell of FIG. 11A.
Figure 11E:
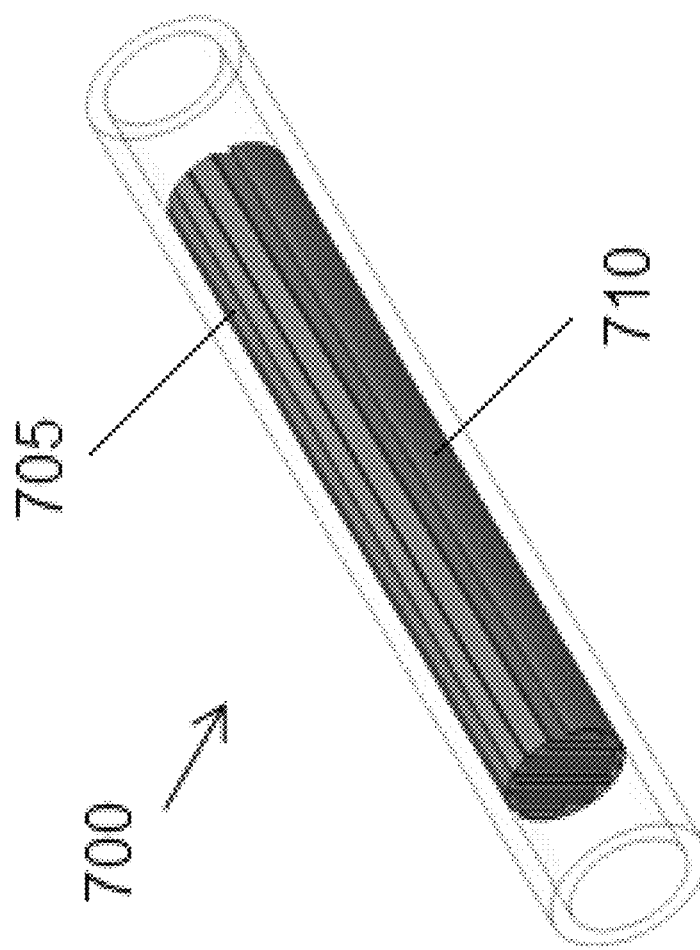
FIG. 11E illustrates an embodiment of an electrochemical cell including interleaved electrodes in a monopolar configuration.
Figure 11F:
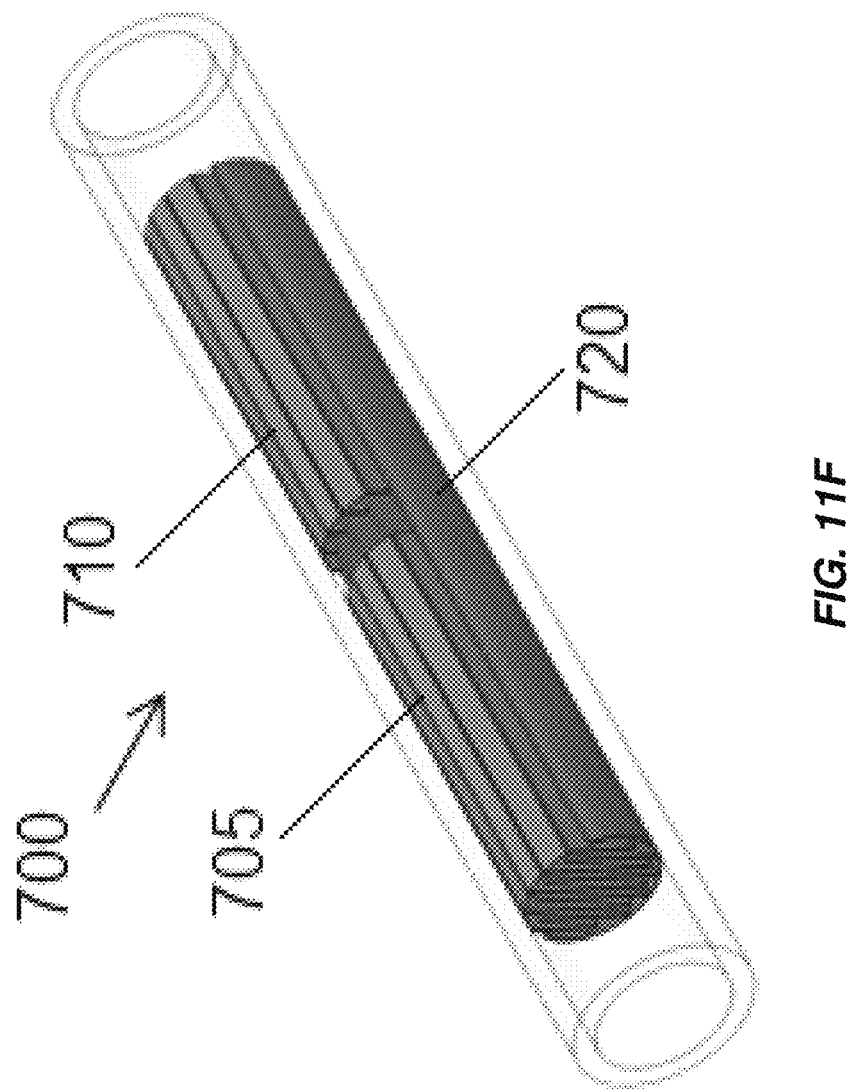
FIG. 11F illustrates an embodiment of an electrochemical cell including interleaved electrodes in a bipolar configuration.

Alternate configurations of the electrochemical cell 700 with different anode-cathode plate spacing are illustrated in FIGS. 11C and 11D. As illustrated, the most external plates 710A, 705A, of the anode 710 or cathode 705 may have thickened portions 710C, 705C, that are thicker than the bases 710B, 705B and that may have thicknesses the same as or greater than the other plates 710A, 705A. In some embodiments, the thickened portions 710C, 705C may be formed by folding sheet metal from which the external plates 710A, 705A are formed over onto itself. The anodes 710 and/or cathodes 705 may be formed by bending of sheet metal (FIG. 11C) and/or by extrusion (FIG. 11D). An electrochemical cell 700 including interleaved anodes and cathodes 710, 705 may be monopolar, with a single anode 710 and cathode 705 (FIG. 11E), or bipolar (FIG. 11F), with a single anode 710 and cathode 705 displaced from one another along a length of the electrochemical cell 700, each having plates interleaved with plates of a bipolar electrode 720. Additional anodes 710 and/or cathodes 705 may be provided to render the electrochemical cell multi-polar.

Electrochemical cells including spiral wound, concentric, radially arranged, and interleaved electrodes are described in further detail in commonly owned PCT application No. PCT/US2016/018213 which is incorporated in its entirety herein by reference.

Aspects and embodiments disclosed herein include electrochemical cells having features for abating, mitigating, minimizing, preventing, or eliminating the formation of hydrogen gas in the electrochemical cell and/or hydrogen dissolved in an electrolyte in the electrochemical cell and to methods for constructing and operating such electrochemical cells. Specific reference will be made to electrochlorination cells configured to generate sodium hypochlorite from a chloride-containing (e.g., sodium chloride-containing) aqueous solution, for example, seawater, brackish water, or brine, although the disclosed features and methods are contemplated for use in other forms of electrochemical cells as well.

It has been discovered that the accumulation of hydrogen produced as a byproduct of the generation of sodium hypochlorite from sodium chloride and water in an electrochlorination cell may be reduced, abated, suppressed, mitigated, minimized, or eliminated by the addition of an oxidizing agent to a chloride-containing aqueous solution including the sodium chloride and water. As discussed above, reactions at a cathode of an electrochlorination cell may include the hydrogen-generating reduction reaction $2H_2O+2e^-\rightarrow H_2+2OH^-$, having a standard potential of $-0.8277$ V. If an oxidizing agent, for example, oxygen is added to the chloride-containing aqueous solution this hydrogen-generating reduction reaction may be replaced by the more energetically favorable reaction $O_2+2H_2O+4e^-\rightarrow 4OH^-$, having a standard potential of 0.401 V. The addition of the oxygen to the chloride-containing aqueous solution may thus cause the chlorine and hydroxide generating reactions at the anode and cathode to be changed from:

A1: Reaction at anode: 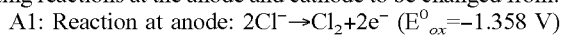 ($E^0_{ox}=-1.358$ V)
C1: Reaction at cathode: 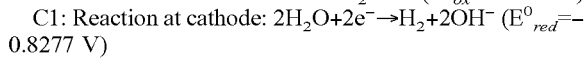 ($E^0_{red}=-0.8277$ V)
$E^0_{cell}=2.19$ V to:

A1: Reaction at anode: 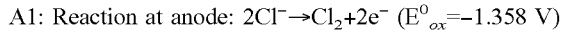 ($E^0_{ox}=-1.358$ V)
C2: Reaction at cathode: 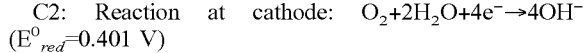 ($E^0_{red}=0.401$ V)
$E^0_{cell}=0.96$ V The addition of the oxygen to the chloride-containing aqueous solution eliminates the generation and/or accumulation of hydrogen in these reactions and also reduces the voltage needed for production of the chlorine and hydroxide by more than half. The addition of the oxygen to the chloride-containing aqueous solution may thus not only reduce or suppress formation and/or accumulation of hydrogen as a byproduct of the generation of sodium hypochlorite from sodium chloride and water in an electrochlorination cell, but may also render the sodium hypochlorite generation process more energy efficient.

Figure 12:
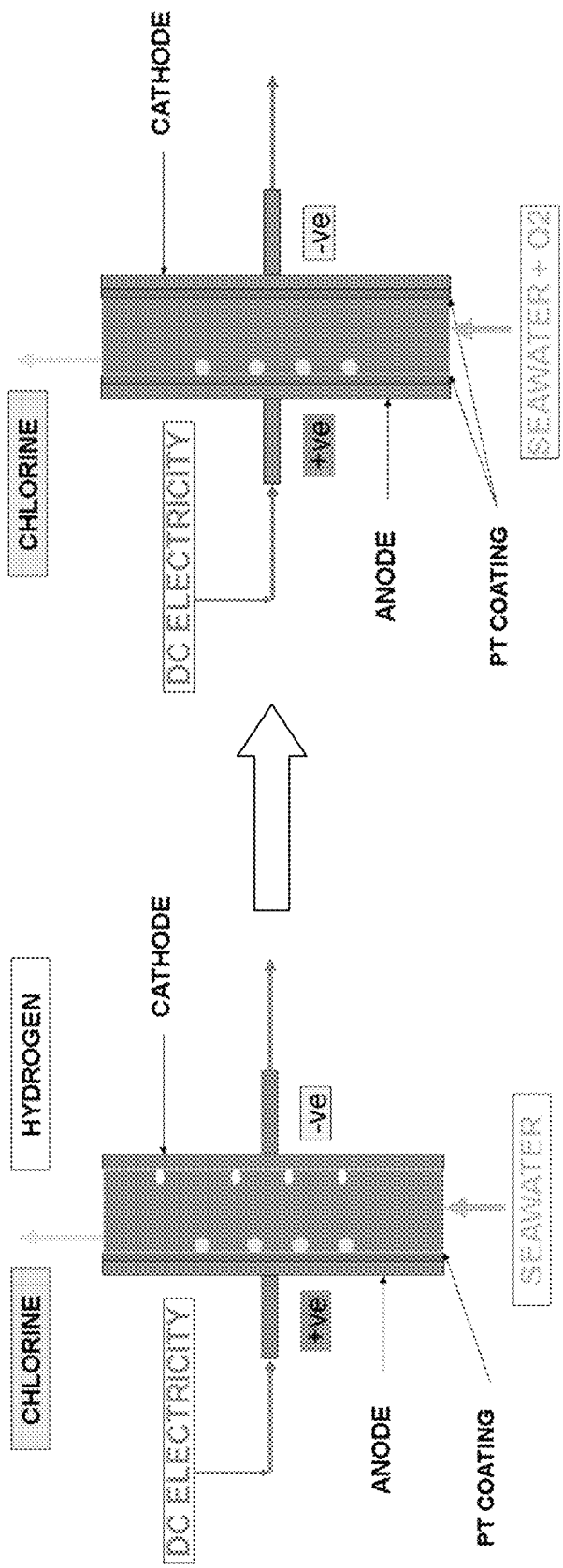
FIG. 12 schematically compares electrochlorination cells operating under different conditions.

A portion of an electrochemical cell operating in accordance with reactions A1 and C1 above is schematically compared to a portion of an electrochemical cell operating in accordance with reactions A1 and C2 above in FIG. 12.

Figure 13:
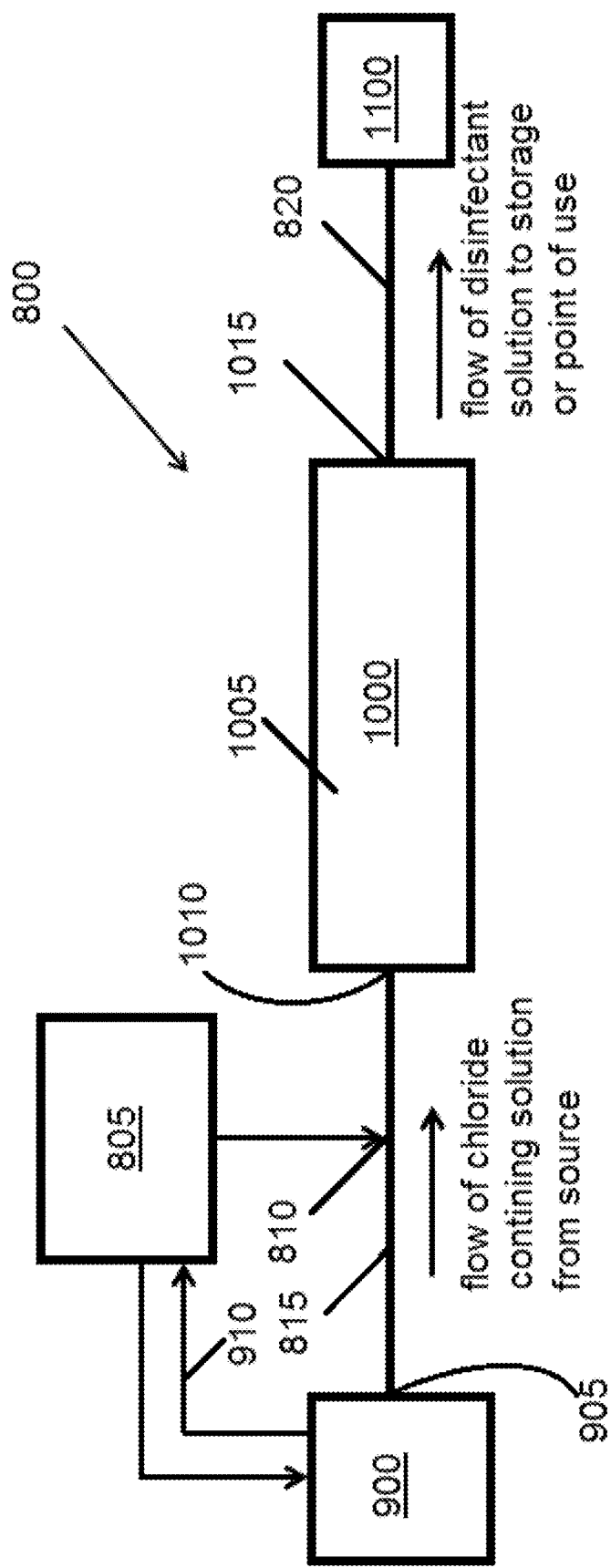
FIG. 13 schematically illustrates a portion of an electrochlorination system.

An embodiment of a portion of an electrochlorination system including an electrochemical cell is illustrated in FIG. 13, indicated generally at 800. In FIG. 13, element 1000 represents an electrochemical cell for the production of chlorine-based disinfectant from a chloride-containing aqueous solution. Electrochemical cell 1000 may be similar to any of the embodiments of electrochemical cells disclosed above. Housing 1005 of the electrochemical cell 1000 includes an inlet 1010 and an outlet 1015. An anode-cathode pair as described above with reference to the various disclosed electrochemical cells is disposed within the housing 1005. A source of chloride-containing aqueous solution 900 includes an outlet 905 that is fluidly connectable (and in operation, fluidly connected) to the inlet 1010 of the electrochemical cell 1000. A source of an oxidizing agent 805 is fluidly connectable (and in operation, fluidly connected) to the source of chloride-containing aqueous solution 900 upstream of the inlet 1010 of the electrochemical cell 1000. The source of oxidizing agent 805 may be fluidly connectable to or connected to the source of chloride-containing aqueous solution 900 directly, or may be fluidly connectable to or connected to an injection point 810 in a conduit 815 fluidly connectable or connected between the source of chloride-containing aqueous solution 900 and the inlet 1010 of the electrochemical cell 1000. The outlet 1015 of the electrochemical cell 1000 is fluidly connectable (and in operation, fluidly connected) to a storage tank or point of use 1100, for example, via conduit 820.

Various pumps may be included in the portion of the system 800 to cause flow of the various aqueous solutions involved, but are not illustrated for the purpose of clarity. Various sensors that may measure various operating parameters of the portion of the system 800 and the various aqueous solutions involved may also be present, but are omitted from FIG. 13 for the purpose of clarity.

In operation, a chloride-containing aqueous solution flows from the source of chloride-containing aqueous solution 900 through conduit 815 and into the inlet 1010 of the electrochemical cell 1000. An oxidizing agent from the source of oxidizing agent 805 is introduced to the chloride-containing aqueous solution. The oxidizing agent from the source of oxidizing agent 805 may be introduced directly into the source of chloride-containing aqueous solution 900 and/or into conduit 815 upstream of the electrochemical cell 1000 where it mixes with the chloride-containing aqueous solution flowing to the electrochemical cell 1000. In the electrochemical cell 1000 a disinfectant solution, for example, a chlorine-based disinfection solution is generated from the chloride-containing aqueous solution. The disinfection solution flows out of the electrochemical cell 1000 through the outlet 1015 and through conduit 820 to the storage tank or point of use 1100.

Figure 14:
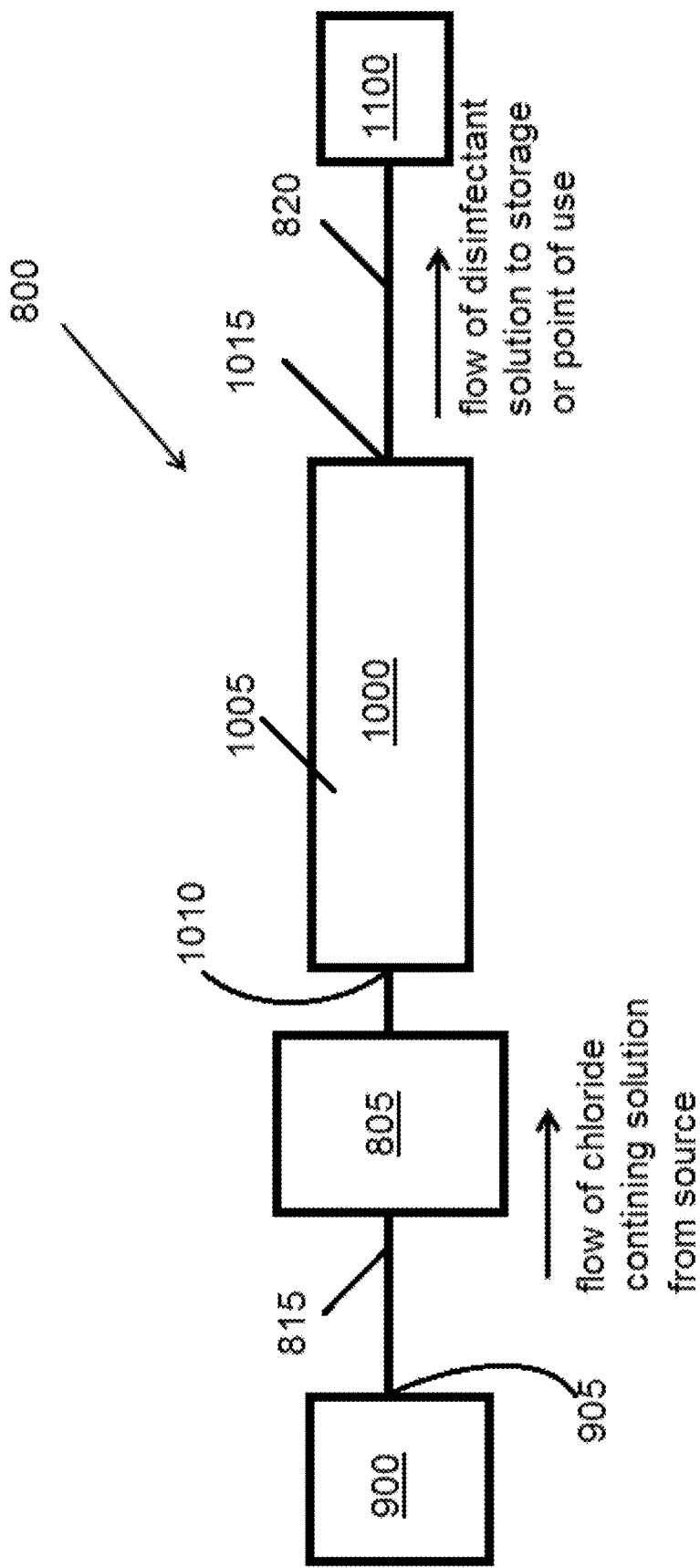
FIG. 14 schematically illustrates a portion of another electrochlorination system.

The source of oxidizing agent 805 may include a system for mixing a gaseous oxidizing agent, for example, air or pure oxygen into an aqueous solution, for example, water or the chloride-containing aqueous solution. The source of oxidizing agent 805 may receive chloride-containing aqueous solution to which the oxidizing agent is to be added from the source of chloride-containing aqueous solution 900, for example, via conduit 910 or via a branch from conduit 815. The source of oxidizing agent 805 may include, for example, a dissolved air flotation pump, a fine bubble tubular diffuser, an aeration vessel, a mixing vessel, a venturi, or another form of oxygenation system configured to mix the oxidizing agent with the chloride-containing aqueous solution upstream of the electrochemical cell. In some embodiments, as illustrated in FIG. 14, the source of oxidizing agent 805 may be inline in conduit 815. The oxidizing agent from the source of oxidizing agent 805 may be introduced into the chloride-containing aqueous solution under pressure greater than atmospheric pressure to increase the solubility of the oxidizing agent in the chloride-containing aqueous solution as compared to the solubility of the oxidizing agent in the chloride-containing aqueous solution under atmospheric pressure. For example, oxygen, air, and/or another oxidizing agent may be introduced into the chloride-containing aqueous solution at an elevated pressure of from about 1 bar gauge to about 7 bar gauge, about 3 bar gauge to about 5 bar gauge, or at any other pressure desired to introduce a desired amount of oxidizing agent into the chloride-containing aqueous solution. In some embodiments, where the oxidizing agent from the source of oxidizing agent 805 is introduced into the chloride-containing aqueous solution under pressure, the oxidizing agent may form microbubbles in the electrochemical cell 1000 as the oxygenated chloride-containing aqueous solution enters the electrochemical cell 1000 and the pressure applied to the oxygenated chloride-containing aqueous solution is reduced relative to the pressure applied to the chloride-containing aqueous solution during introduction or exposure to the oxidizing agent.

Figure 15:
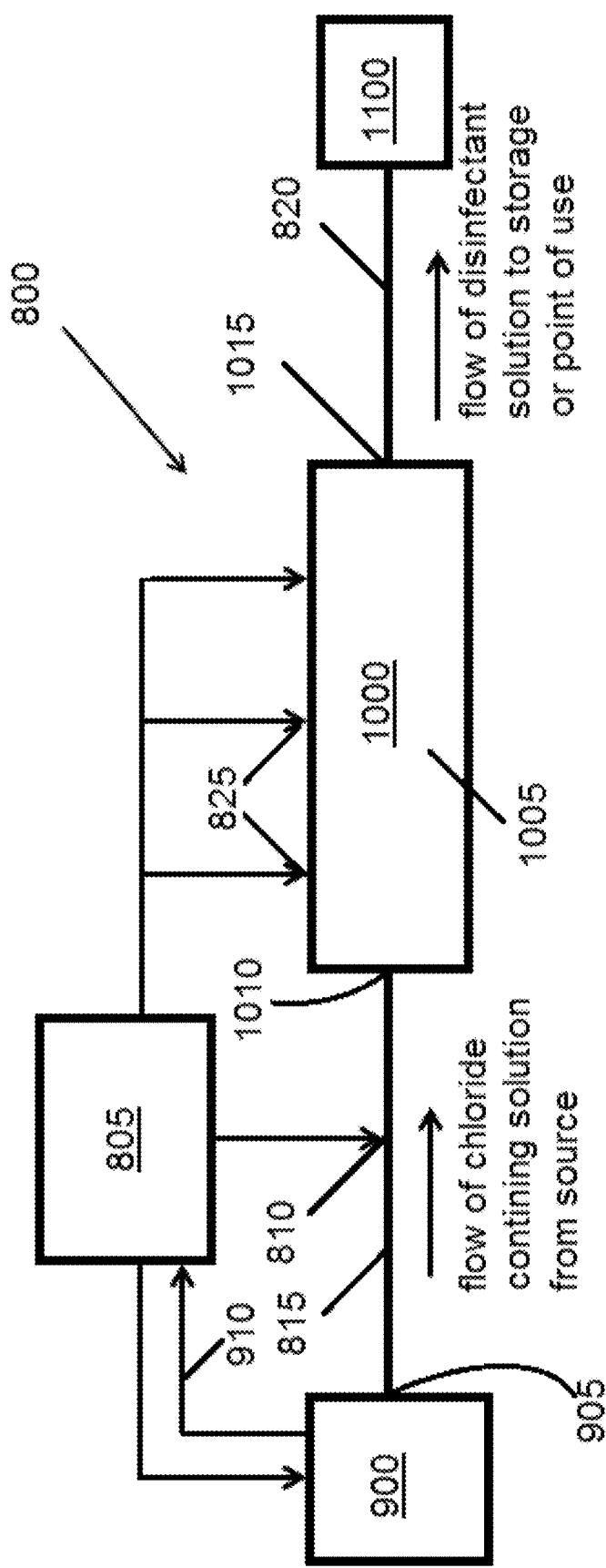
FIG. 15 schematically illustrates a portion of another electrochlorination system.

In another embodiment, the electrochemical cell 1000 further includes one or more oxidizing agent injection points 825 in the housing 1005 between the inlet 1010 and the outlet 1015, as illustrated in FIG. 15. The oxidizing agent injection points 825 may be substantially evenly spaced along a length of the housing 1005. These additional oxidizing agent injection points 825 may provide for introduction of additional oxidizing agent into the electrochemical cell 1000 only to the extent desired and where desired. For example, if the oxidizing agent includes a gas such as air or oxygen, it may be undesirable to introduce too much oxidizing agent into the inlet 1010 of the electrochemical cell 1000 because it might come out of solution as gas bubbles and shield portions of the anode or cathode in the electrochemical cell 1000, reducing the electrode area available for generating the disinfectant. The inclusion of multiple oxidizing agent injection points 825 may provide for introduction of a lesser amount of oxidizing agent at the inlet 1010 than might be desired to react with hydrogen throughout the length electrochemical cell. Additional oxidizing agent may be introduced at the additional oxidizing agent injection points 825 to make up for the loss of oxidizing agent that was introduced through the inlet 1010 via reaction with hydrogen in the electrochemical cell 1000. The use of multiple oxidizing agent injection points 825 in the housing 1005 may facilitate maintaining a substantially even concentration of oxidizing agent along the length of the electrochemical cell 1000. The use of multiple oxidizing agent injection points 825 in the housing 1005 may facilitate delivery of oxidizing agent to desired areas in the electrochemical cell 1000 that oxidizing agent introduced through the inlet 1010 might not reach due to, for example, low turbulence and a small amount of mixing or a low Reynolds number for fluid flow within the electrochemical cell 1000.

In addition to, or as an alternative to air or oxygen, the oxidizing agent may include any one or more of oxygen enriched air, ozone, carbon dioxide, hydrogen peroxide, fluorine, chlorine, bromine, iodine, nitric acid, nitrous oxide, a nitrate, sulfuric acid, peroxysulfuric acid, peroxymonosulfuric acid, a hexavalent chromium compound, a permanganate compound, sodium perborate, potassium nitrate, or any other known oxidizing compound known. The oxidizing agent may be a gas, a solid, or a liquid phase agent. The oxidizing agent may include any chemical compound having a sufficiently low reducing potential to intercept electrons from passing into a water molecule to generate free hydrogen. The oxidizing agent may include any chemical compound having a reducing potential that is less negative than $-0.8277$ volts versus a standard hydrogen electrode. The reducing potential of the oxidizing agent may vary based on kinetic factors such as concentration, temperature, and the effect of a catalyst.

Introducing the oxidizing agent into the chloride-containing aqueous solution may include contacting the chloride-containing aqueous solution with an oxygen-containing gas. Introducing the oxidizing agent into the chloride containing solution may include injecting an oxygen-containing liquid into the chloride-containing solution.

The chloride-containing aqueous solution may include one of seawater, brackish water, or brine.

The point of use 1100 may include a shipboard system, a drilling platform system, an aquatics system (for example, a swimming pool or a fountain), a drinking water system, or a downhole of an oil drilling system. The point of use 1100 may include a cooling water system of a ship or sea based platform or a ballast tank of a ship.

Figure 16:
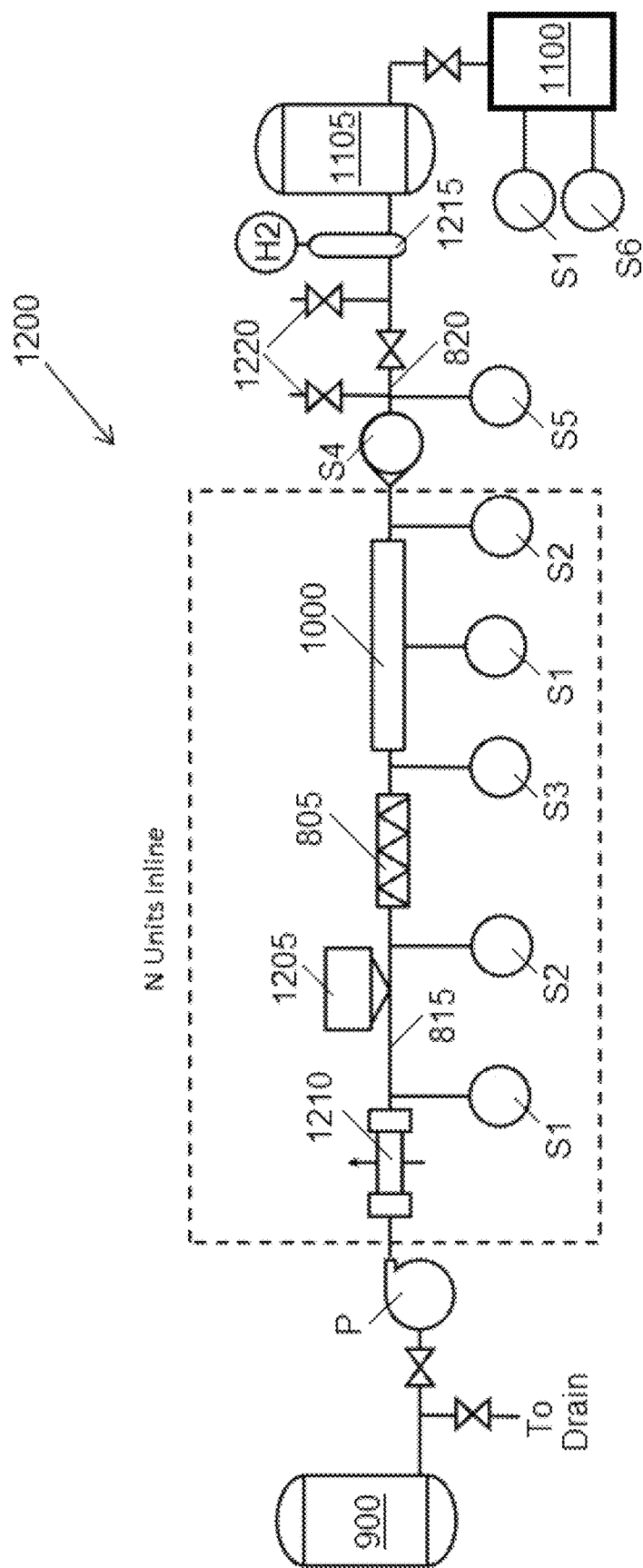
FIG. 16 schematically illustrates a portion of another electrochlorination system.

Another embodiment of a portion of an electrochlorination system is illustrated in FIG. 16, indicated generally at 1200. System 1200 includes an electrochemical cell 1000 that may be similar to any of the embodiments of electrochemical cells disclosed above. A source of oxidizing agent or oxidizing system 805 is disposed in conduit 815 upstream of the electrochemical cell 1000. The source of chloride-containing aqueous solution 900 is illustrated as a tank. The point of use 1100 is disposed downstream of the electrochemical cell 1000. A holding or storage tank 1105 is disposed between the electrochemical cell 1000 and the point of use 1100 and is connected to the point of use 1100 by a valve (unlabeled) that may be opened, closed, or adjusted to dose the point of use 1100 with desired amounts of disinfectant generated in the electrochemical cell 1000. System 1200 further includes a pH adjustment system 1205 including a source of pH adjuster, for example, a mineral acid or a caustic such as NaOH and a heat exchanger 1210. The pH adjustment system 1205 may adjust the pH of the chloride-containing aqueous solution to a pH rendering reactions for generation of a desired species of chlorine-based disinfectant in the electrochemical cell 1000 favorable, to a pH high enough such that the formation of chlorine gas in the electrochemical cell 1000 is suppressed, and/or to a pH low enough such that precipitation of magnesium from the chloride-containing aqueous solution in the electrochemical cell 1000 is suppressed. The pH adjustment system 1205 may adjust the pH of the chloride-containing aqueous solution to a pH of, for example, between about 2 and about 14 or between about 7 and about 10. The heat exchanger may be used to adjust the temperature of the chloride-containing aqueous solution to a temperature that results in desired reaction kinetics in the electrochemical cell 1000 and/or to adjust the solubility of oxygen or hydrogen in the chloride-containing aqueous solution.

System 1200 includes multiple sensors that may feed data to a control system (not illustrated in FIG. 16) which may adjust operating parameters of components of the system 1200 based on the data from the sensors. The sensors may include a temperature sensor S1 downstream of the heat exchanger 1210 which may provide feedback for control of the heat exchanger, a temperature sensor S1 in or on the electrochemical cell 1000 which may be used to provide data that the controller may use to adjust dosages of oxidizing agent into the chloride-containing aqueous solution, and a temperature sensor S1 in or on the point of use 1100 which may provide feedback to the controller that may be used to determine when and how much disinfectant should be dosed into the point of use 1100. pH sensors S2 may be provided upstream and/or downstream of the electrochemical cell 1000 and may provide feedback to the controller that may be used to adjust operation of the pH adjustment system 1205 to keep the pH of the chloride-containing aqueous solution entering the electrochemical cell 1000 and/or disinfection solution exiting the electrochemical cell 1000 within desired ranges. For example, the pH adjustment system 1205 may be operated keep the pH of the chloride-containing aqueous solution entering the electrochemical cell 1000 between about 4 and about 10.

A dissolved oxygen sensor S3 may be used to measure dissolved oxygen levels in the chloride-containing aqueous solution. The controller may utilize an indication of the dissolved oxygen level in the chloride-containing aqueous solution to control the source of oxidizing agent or oxidizing system 805 to maintain the dissolved oxygen level in the chloride-containing aqueous solution to be introduced in to the electrochemical cell within a desired range. A flow sensor S4 may provide disinfection solution flow rate data to the controller which may use this data to control operation of pump P, the source of oxidizing agent or oxidizing system 805, and/or current or voltage applied across the anode-cathode pair of the electrochemical cell 1000. An electrical meter S5, for example, a potentiostat may be utilized to measure electrical parameters and/or generate a current-voltage curve of the disinfection solution which may be utilized to gain information about whether the electrochemical cell is operating in a desired regime in which substantially all hydrogen in the electrochemical cell is being reacted with oxygen supplied in the chloride-containing aqueous solution. Data from the electrical meter S5 may be used by the controller to control operation of pump P, the source of oxidizing agent or oxidizing system 805, and/or current or voltage applied across the anode-cathode pair of the electrochemical cell 1000. An oxidation reduction potential (ORP) meter S6 may be provided to obtain readings of ORP of liquid in the point of use 1100 which may be used by the controller to determine when and how much disinfectant should be dosed into the point of use 1100.

System 1200 may further include a gas separation column 1215 that may be used to remove residual hydrogen from the disinfection solution. A breakout loop 1220 may be provided to allow for sampling of the disinfectant solution and/or addition of additional or alternate sensors, for example, sensors for measuring chlorine, oxygen, or hydrogen levels in the disinfectant solution.

Various components of the system 1200 may be serially repeated in line with one another. For example, system 1200 may have multiple repeated subsystems including a heat exchange 1210, pH adjustment system 1205, source of oxidizing agent or oxidizing system 805, electrochemical cell 1000, and possibly pump P arranged serially in line with one another.

Figure 17:
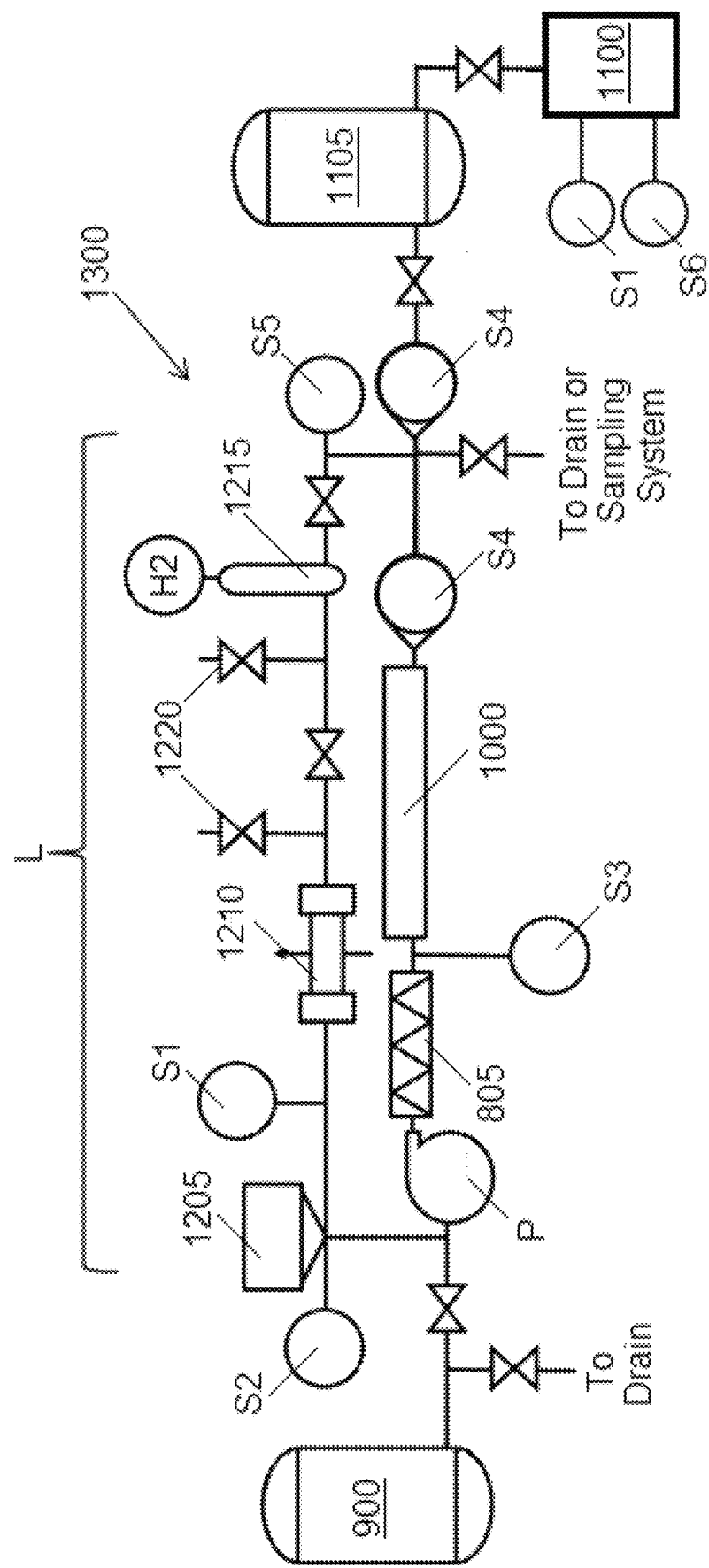
FIG. 17 schematically illustrates a portion of another electrochlorination system.

Another embodiment of an electrochlorination system is indicated generally at 1300 in FIG. 17. System 1300 includes similar components as system 1200 of FIG. 16 which are labelled with identical indicators. System 1300 differs from system 1200 in that system 1300 is a "feed & bleed" system whereas system 1200 is a "once through" type of system. In system 1300 disinfectant solution generated by electrochemical cell 1000 circulates around loop L until it is desired to output some disinfectant solution to storage tank 1105 and/or point of use 1100. As or after disinfection solution is removed from loop L, additional chloride-containing aqueous solution may be introduced to loop L from source of chloride-containing aqueous solution 900.

Electrochemical or electrochlorination cells and devices as disclosed herein may be included as part of a larger system. One example of a system employing one or more electrochemical or electrochlorination cells or devices is illustrated generally at 1400 in FIG. 18. The system 1400 is in some embodiments a sea-based system, for example, a ship or an oil rig, and in other embodiments is a land based building, for example, a power plant, an oil drilling facility or system or other industrial facility. In other embodiments, the system 1400 is or may include a swimming pool, or a treatment system for drinking water, wastewater, or industrial water treatment processes, that uses one or more products of electrochemical devices in the system 1400, for example, a disinfectant to treat or disinfect water.

The system 1400 includes one or more electrochlorination systems 1405 that may include one or more electrochemical or electrochlorination cells or devices as disclosed herein. Electrochlorination system 1405 may be substantially similar and may include substantially similar components as any of the electrochlorination systems described above, for example, with reference to any one or more of FIGS. 13-17. Electrochlorination system 1405 may receive an oxidizing agent from a source of oxidizing agent 1435, which may be substantially similar and may include substantially similar components as any of the sources of oxidizing agent disclosed above and/or may include a gas separation system as described in the example implementation below.

The 1400 system may draw process liquid or electrolyte, which in some embodiments is seawater, brackish water, or brine from sources external 1410A and/or internal 1410B to the system. For example, if the system is a sea-based system, external source 1410A may be the ocean and internal source 1410B may be, for example, a ballast tank in a ship. In land based system, external source 1410A may be the ocean and internal source 1410B may be brackish wastewater from an industrial process performed in the system 1400. The one or more electrochlorination systems 1405 produce chlorinated water and/or a solution including sodium hypochlorite from the water from sources 1410A and/or 1410B and distribute it to a point of use 1415. The point of use may be a source of cooling water for the system, a source of disinfection agent for a ballast tank of a ship, a downhole of an oil drilling system, or any other system in which a chlorine-based disinfection solution may be useful.

Various pumps 1420 may control the flow of fluid through the system 800. One or more sensors 1425 may monitor one or more parameters of fluid flowing through the system, for example, of chlorine-containing aqueous solution to be introduced to an electrochemical cell 1000 in the one or more electrochlorination systems 1405, fluid internal to the electrochemical cell, liquid in the point of use 1415, or of disinfection solution produced or generated in the electrochemical cell. These parameters may include, for example, flow rate, ionic concentration, chlorine concentration, oxygen concentration, hydrogen concentration, pH, electrical parameters, temperature, oxygen reduction potential (ORP), or any other parameter of interest. Additional sensors may monitor parameters of the electrochemical cell itself, for example, current and/or voltage across an anode-cathode pair in the electrochemical cell, temperature of or within the electrochemical cell, or flow rate of electrolyte through the electrochemical cell.

The pumps 1420 and sensors 1425 are in communication with a control system or controller 1430 which communicates with the sensors 1425 and pumps 1420 and controls operation of the pumps 1420 and other elements of the system 1400 to achieve desired operating parameters.

Figure 18:
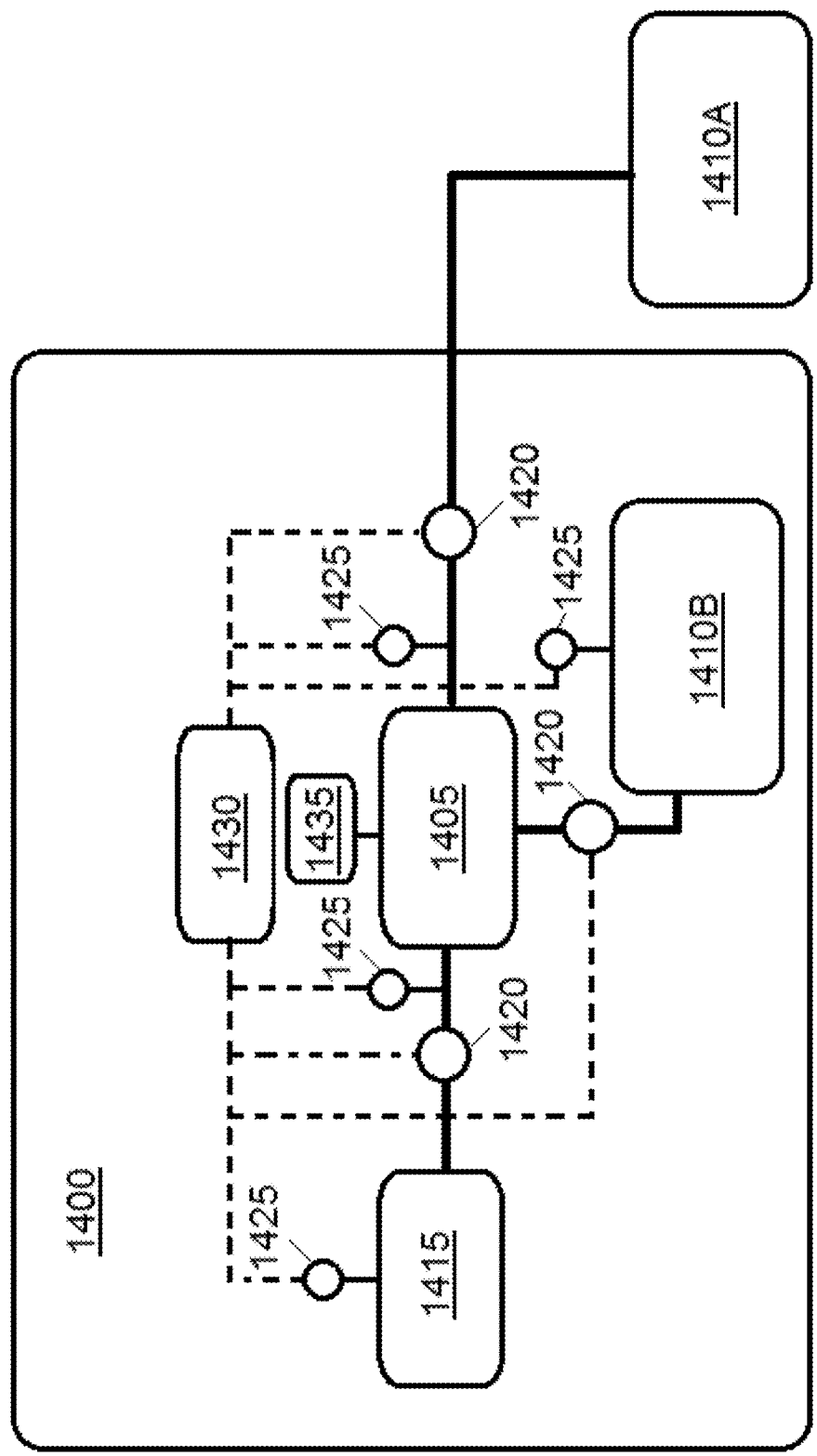
FIG. 18 illustrates a system in which embodiments of electrochemical cells disclosed herein may be utilized.

Various operating parameters of the electrochlorination systems disclosed herein may be controlled or adjusted by an associated control system or controller, for example, a controller similar to controller 1430 illustrated in FIG. 18, based on various parameters measured by various sensors located in different portions of the electrochlorination systems. The controller may be programmed or configured to regulate introduction of oxidizing agent into chloride-containing aqueous solution to be introduced to the electrochemical cell of an electrochlorination system based at least on one or more of a flow rate of the chloride-containing aqueous solution, a concentration of chloride in the chloride-containing aqueous solution, or an oxidation-reduction potential of a liquid in a point of use for a disinfectant solution generated in the electrochemical cell. The controller may be programmed or configured to regulate introduction of the oxidizing agent into the chloride-containing aqueous solution based at least on a concentration of a chlorine-based disinfectant compound generated in the electrochemical cell. The controller may be further configured to regulate the concentration of the chlorine-based disinfectant compound generated in the electrochemical cell based at least on an oxidation-reduction potential of liquid in a point of use fluidly connectable to the outlet of the housing of the electrochemical cell.

The controller may be programmed or configured to regulate introduction of the oxidizing agent into the chloride-containing aqueous solution based at least on one or more of temperature in the electrochemical cell, pH of the chloride-containing aqueous solution, or pH of a disinfection solution generated in the electrochemical cell. The controller may be programmed or configured to regulate introduction of the oxidizing agent into the chloride-containing aqueous solution based at least on one or more of an amount of gaseous hydrogen present in the electrochemical cell, a concentration of hydrogen dissolved the chloride-containing aqueous solution, a concentration of oxygen dissolved in the chloride-containing aqueous solution, or a concentration of oxygen dissolved in a disinfection solution generated in the electrochemical cell.

The controller may be programmed or configured to regulate one or more of a current across the anode-cathode pair or a voltage applied across the anode-cathode pair based on a flow rate of the chloride-containing aqueous solution and a rate of introduction of the oxidizing agent into the chloride-containing aqueous solution. The controller may be programmed or configured to introduce the oxidizing agent into the chloride-containing aqueous solution in an amount sufficient to suppress accumulation of substantially all hydrogen gas within the electrochemical cell. The controller may be programmed or configured to introduce the oxidizing agent into the chloride-containing aqueous solution in an amount approximately stoichiometric with a quantity of chlorine-based disinfectant compound produced in the electrochemical cell, and potentially overdose the oxidizing agent above the stoichiometric amount, for example, to provide sufficient oxidizing agent availability at the cathode(s) of the electrochemical cell such that hydrogen is not generated at the cathode(s) during operation. The amount of oxygen overdosing may be dependent on, for example, flow conditions or turbulence within the electrochemical cell, diffusivity of oxygen within the electrochemical cell, operating current, cathode area, etc. The controller may be programmed or configured to introduce the oxidizing agent into the chloride-containing aqueous solution in an amount sufficient to provide for substantially all free hydrogen in the electrochemical cell to be oxidized.

The controller 1430 used for monitoring and controlling operation of the various elements of system 1400 may include a computerized control system. Various aspects of the controller 1430 may be implemented as specialized software executing in a general-purpose computer system 1500 such as that shown in FIG. 19. The computer system 1500 may include a processor 1502 connected to one or more memory devices 1504, such as a disk drive, solid state memory, or other device for storing data. Memory 1504 is typically used for storing programs and data during operation of the computer system 1500. Components of computer system 1500 may be coupled by an interconnection mechanism 1506, which may include one or more busses (e.g., between components that are integrated within a same machine) and/or a network (e.g., between components that reside on separate discrete machines). The interconnection mechanism 1506 enables communications (e.g., data, instructions) to be exchanged between system components of system 1500. Computer system 1500 also includes one or more input devices 1508, for example, a keyboard, mouse, trackball, microphone, touch screen, and one or more output devices 1510, for example, a printing device, display screen, and/or speaker.

The output devices 1510 may also comprise valves, pumps, or switches which may be utilized to introduce product water (e.g. brine, brackish water, or seawater) from the source 1410A and/or 1410B into the electrochlorination system 1405 or point of use 1415 and/or to control the speed of pumps 1420. One or more sensors 1514 may also provide input to the computer system 1500. These sensors may include, for example, sensors 1425 which may be, for example, pressure sensors, chemical concentration sensors, temperature sensors, or sensors for any other parameters of interest to system 1400. These sensors may be located in any portion of the system 1400 where they would be useful, for example, upstream of point of use 1415 and/or electrochlorination system 1405 or in fluid communication with source 1410A and/or 1410B. In addition, computer system 1500 may contain one or more interfaces (not shown) that connect computer system 1500 to a communication network in addition or as an alternative to the interconnection mechanism 1506.

Figure 20:
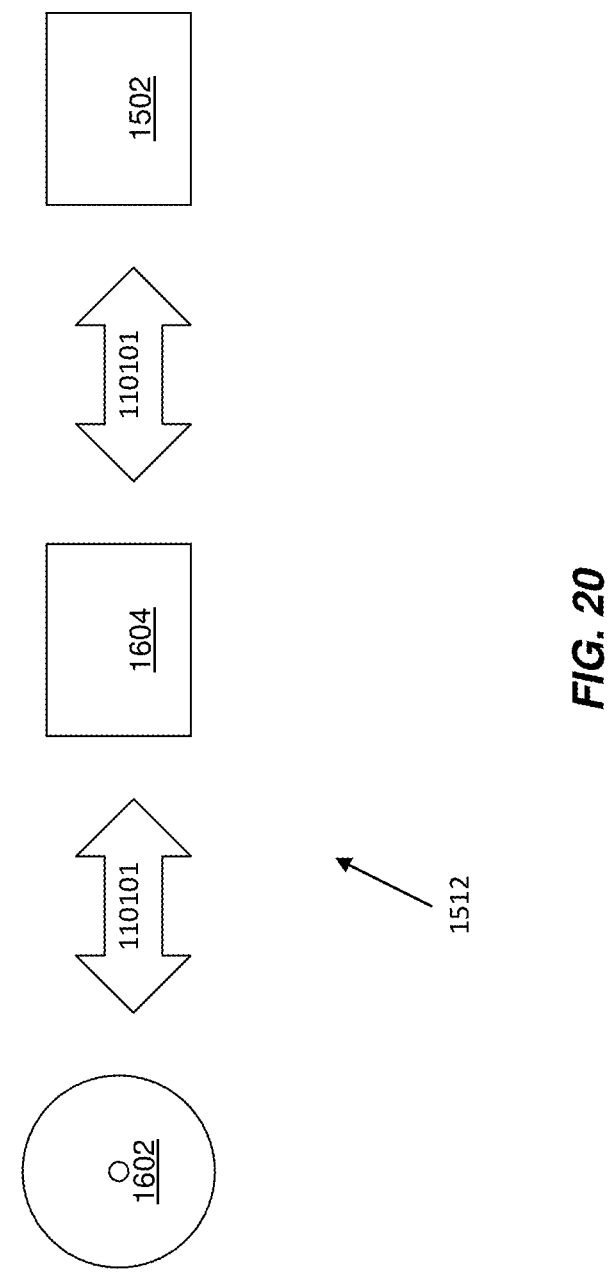
FIG. 20 illustrates a memory system for the control system of FIG. 19.

The storage system 1512, shown in greater detail in FIG. 20, typically includes a computer readable and writeable nonvolatile recording medium 1602 in which signals are stored that define a program to be executed by the processor 1502 or information to be processed by the program. The medium may include, for example, a disk or flash memory. Typically, in operation, the processor causes data to be read from the nonvolatile recording medium 1602 into another memory 1604 that allows for faster access to the information by the processor than does the medium 1602. This memory 1604 is typically a volatile, random access memory such as a dynamic random access memory (DRAM) or static memory (SRAM). It may be located in storage system 1512, as shown, or in memory system 1504. The processor 1502 generally manipulates the data within the integrated circuit memory 1604 and then copies the data to the medium 1602 after processing is completed. A variety of mechanisms are known for managing data movement between the medium 1602 and the integrated circuit memory element 1604, and aspects and embodiments disclosed herein are not limited thereto. Aspects and embodiments disclosed herein are not limited to a particular memory system 1504 or storage system 1512.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 19:
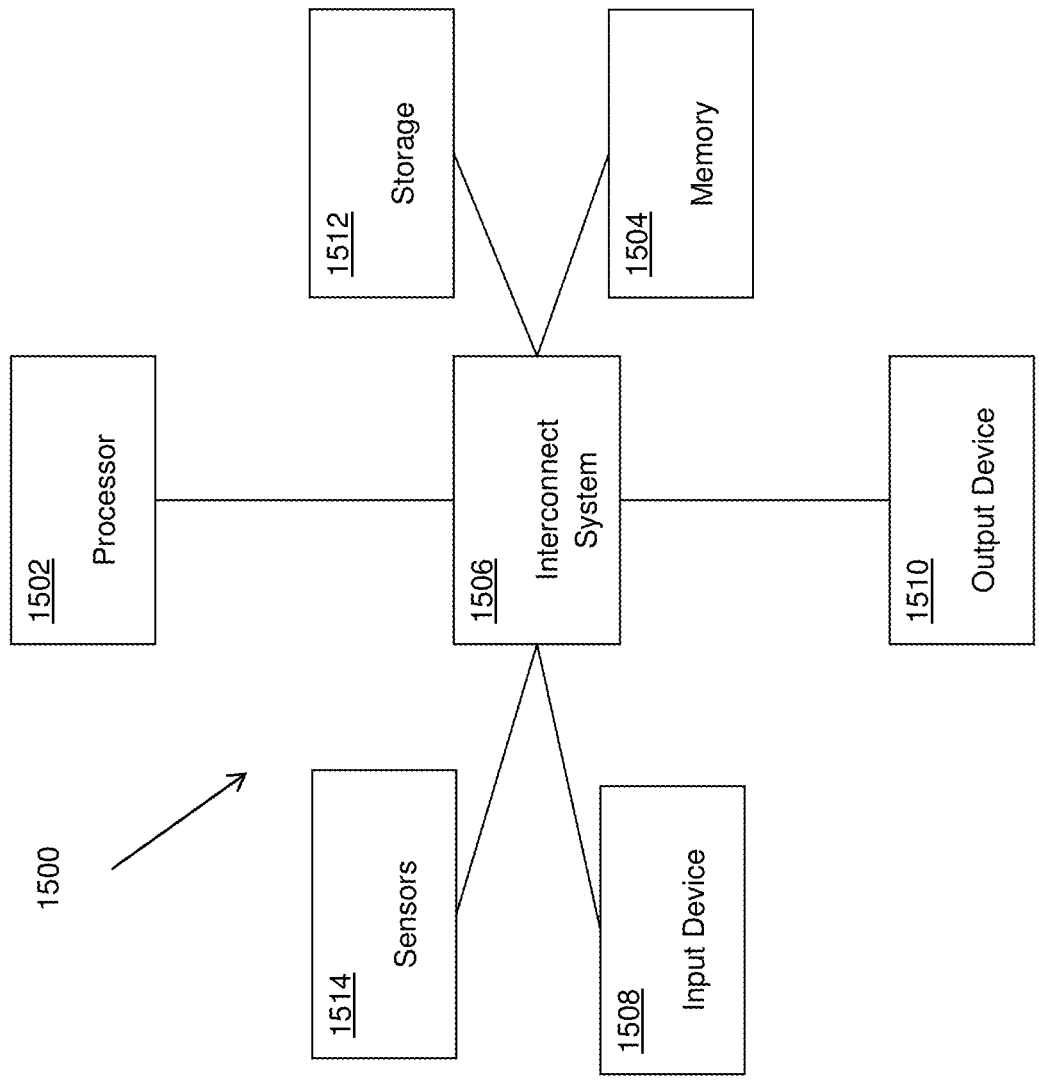
FIG. 19 illustrates a control system for embodiments of electrochemical cells disclosed herein.

Although computer system 1500 is shown by way of example as one type of computer system upon which various aspects and embodiments disclosed herein may be practiced, it should be appreciated that aspects and embodiments disclosed herein are not limited to being implemented on the computer system as shown in FIG. 19. Various aspects and embodiments disclosed herein may be practiced on one or more computers having a different architecture or components than shown in FIG. 19.

Computer system 1500 may be a general-purpose computer system that is programmable using a high-level computer programming language. Computer system 1500 may be also implemented using specially programmed, special purpose hardware. In computer system 1500, processor 1502 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 1500 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example, ladder logic. Various aspects and embodiments disclosed herein may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

In some embodiments, an existing electrochlorination system may be modified or upgraded to include elements of the electrochlorination systems disclosed herein or to operate in accordance with the electrochlorination systems disclosed herein. A method of retrofitting an electrochlorination cell to reduce generation of hydrogen in the electrochlorination cell may include installing a system configured to introduce an oxidizing agent into electrolyte upstream of an electrolyte inlet of the electrochlorination cell.

Example Implementation: Ship-Based System

Ships use ballast water tanks to provide stability and maneuverability. Typically, ballast tanks are filled with water such as seawater at one port after or during cargo loading or unloading operations. This ballast water may be discharged at another port when cargo is either off-loaded or loaded. Effectively, the ballast water is transferred form the first port to the second port with the potential for the introduction of aquatic nuisance species (ANS) at the second or discharge port. ANS transfer can be a detrimental ecological issue. One way to control ANS transfer is through the use of a ballast water disinfection system.

Chlorine-based disinfection system typically utilize any of dry chlorine gas, bulk sodium hypochlorite and in-situ chlorine or sodium hypochlorite electrolytic generators. The electrolysis of seawater to produce chlorine has been used in land-based industrial and off-shore applications for biofouling control of cooling systems such as systems that utilize seawater as a coolant. The development of self-cleaning tube-in-tube electrochemical cells has resulted in the use of electrochlorination in shipboard applications such as biofouling control of engine cooling systems and air conditioning and other auxiliary systems.

A ballast water disinfection system may use an electrolytic cell to generate chlorine species from seawater for the purpose of reducing or eliminating ANS transfer. A ballast water disinfection system may be installed on the ship and generate chlorine species through the electrolysis of seawater. In some embodiments, the method of treating water to be introduced into the ballast tank can comprise introducing a biocide into the water and regulating a rate of introduction of the biocide to a achieve a target water oxidation reduction potential value (a measure of the biocide strength) in a range from about 200 mV to about 1,000 mV in the water.

Hydrogen gas is generated during the electrolytic process. Hydrogen gas is an unwanted by-product due to the explosive nature of hydrogen. Removal of hydrogen can be accomplished by air blowers that dilute the hydrogen to below explosive limits. Direct hydrogen removal can be effected with hydrocyclones instead of air blowers. However, it would be a tremendous benefit if the evolution of hydrogen could be prevented entirely. An electrolytic cell as disclosed herein that is supplied with a chloride-containing aqueous solution, for example, seawater to which an oxidizing agent, for example, oxygen has been added may overcomes this problem by supplying oxygen at the cathode. As discussed above, a reaction between oxygen and water at the cathode ($O_2+2H_2O+4e^-\rightarrow 4OH^-$) is energetically more favorable than a reaction involving the generation of hydrogen from water at the cathode ($2H_2O+2e^-\rightarrow H_2+2OH^-$.) Hydrogen gas evolution at the cathode is essentially eliminated if the feed electrolyte to the electrochlorination cell includes sufficient oxygen. While both air or oxygen would both work to eliminate hydrogen evolution, oxygen may be preferable since the process would work more efficiently and a lower volume of gas would be required.

Gas separation systems are used increasingly on ships to provide inert environments. It these systems air is separated into nitrogen and oxygen. The nitrogen is used for providing an inert gas and oxygen is considered a waste product. Uses for purified nitrogen in a shipboard environment may include any one or more of:

Providing an inert environment to cargo tanks during cargo discharge (as full inert gas system).
General purging/cargoes tank stripping purpose.
Padding of highly oxygen sensitive cargo.
Bleeding of insulation space onboard LNG vessels.
Isolation of cryogenic compressors.
Providing an inert environment to Methanol tanks.
Controlled Atmosphere (CA) for fruits and vegetables.
LNG propulsion; purging of fuel pipes etc.
For Ballast Water Management Systems.

Nitrogen purification systems may find similar uses in land-based systems or sea-based platforms, for example, oil platforms.

Some aspects and embodiments disclosed herein may utilize the enriched oxygen stream produced by a nitrogen purification system by adding it to a feed to an electrochlorination cell, thus improving the performance, reducing the size, and making the electrochlorination process more efficient.

A component of some examples of nitrogen purification systems is the PRISM® membrane separator modules (Air Products and Chemicals, Inc.) Each module contains thousands of hollow fiber membranes allowing the oxygen, water vapor, and carbon dioxide in compressed air to be selectively removed, resulting in a nitrogen rich product stream. By adjusting the airflow rate through the membrane module, different nitrogen flow rates can be produced.

The membranes are formed into hollow fibers to obtain maximum membrane surface per unit of volume. Thousands of fibers are bundled into a casing that protects the fibers, routes the gas properly from feed to product end—and creates handy and standardized units that can easily be stacked together for modular capacity increase of the system.

The air that we breathe contains approximately 78% nitrogen, 21% oxygen and 1% other gases (argon, $H_2O$, etc.). The PRISM® membranes utilize this unlimited supply of raw material to produce specific purities of nitrogen.

Atmospheric air is compressed, filtered, heated and fed to the bore side of the membranes. As the air flows inside the individual fibers, $O_2$, $CO_2$ and $H_2O$ (vapor) contained in the air, permeate faster than nitrogen through the membrane walls to the low-pressure side of the fibers. The bore side air is gradually depleted of the fast gases—consequently increasing the nitrogen percentage. The final product can then be lead directly to a point of use, or be stored in a $N_2$ receiver tank for later usage.

Example: Electrical Characteristics of Brine Solution v. Flow Rate and Oxygen Concentration A brine solution (3.5% NaCl by weight in water) was passed through a sample electrochlorination device having a flow cavity with dimensions of 50 mm×20 mm×2.5 mm and titanium mesh electrodes having surface areas of 0.00126 m². Air or oxygen was applied to the brine solution at different pressures to add different amounts of oxygen to the brine solution prior to passing through the sample electrochlorination device. The air or oxygen was added to the brine solution by bubbling the air or oxygen at the different pressures through the brine solution until the brine solution became saturated with oxygen at the different air or oxygen pressures. The brine was passed through the sample electrochlorination device at various flow rates.

Figure 21:
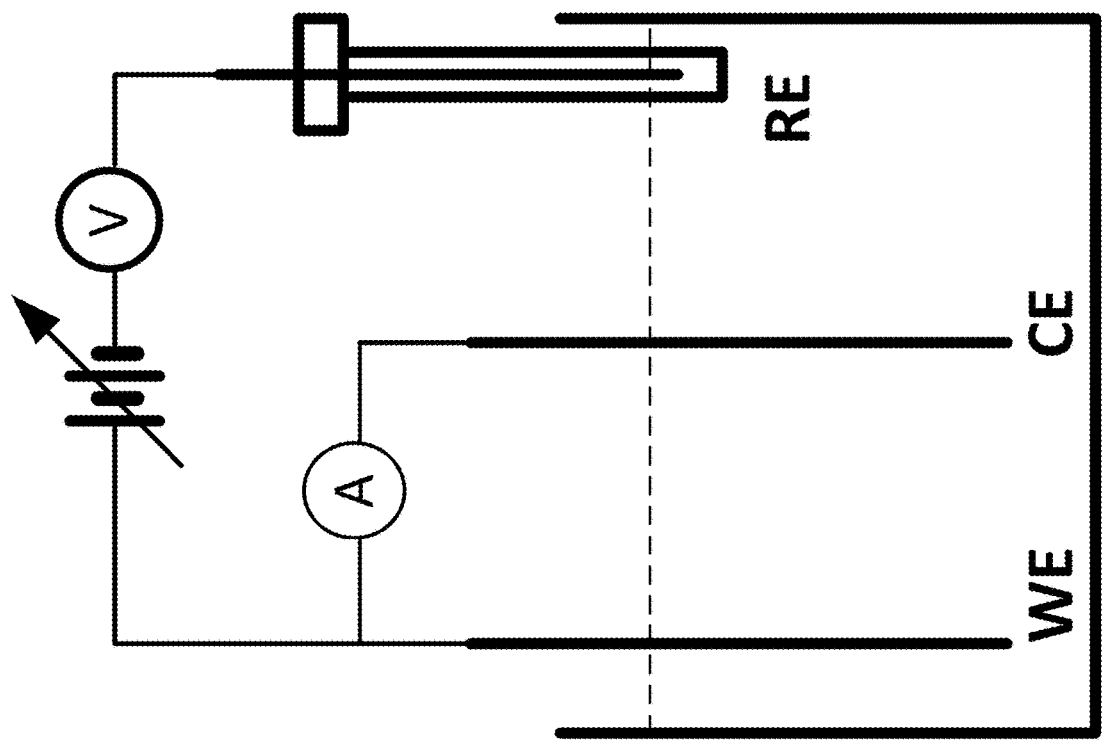
FIG. 21 is a schematic illustration of a potentiostat used to obtain electrical data of a test electrochlorination device.

Current-voltage curves were generated for the differently oxygenated brine solutions flowing at the different flow rates using a potentiostat. A schematic diagram of a potentiostat is illustrated in FIG. 21. The potentiostat is a three-electrode system including a working electrode WE, a counter electrode CE, and a reference electrode RE. In the potentiostat utilized, the working electrode and counter electrode are titanium electrodes and the reference electrode is a silver chloride electrode. In operation a small voltage is applied between the RE and WE. The RE draws minimal current and does not disturb the system. A potentiostat similar to that illustrated in FIG. 21 may be utilized for the electrical sensor S5 illustrated in the systems in FIGS. 16 and 17. The three electrode experimental system may be implemented in full scale operational units by constructing two small pieces of electrodes as the WE and RE and a reference electrode of AgCl or a saturated calomel electrode (SCE) may be inserted in the system flow.

During testing of a sample electrochlorination device using the potentiostat to gather electrical data, voltage across the RE and WE was scanned at 50 mV/sec increasing voltage. Current was measured between the WE and CE. The cathode of the sample electrochlorination device was used as the WE and the anode was used as the CE. The RE was disposed external to the sample electrochlorination device. The voltage and current measurements were plotted against each other to produce I-V curves for the different brine solutions and flow rates.

Figure 22:
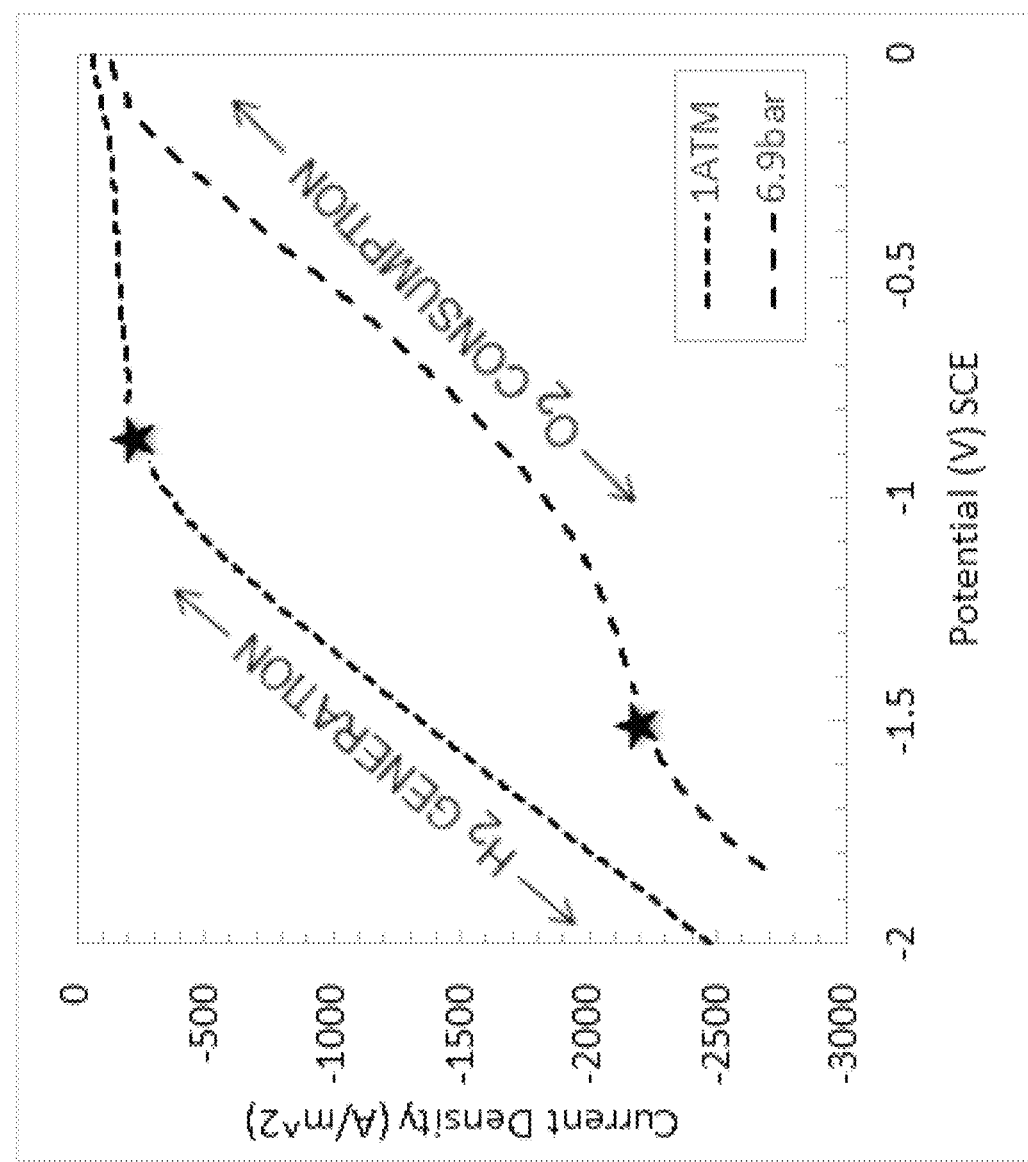
FIG. 22 is a sample I-V curve for a brine solution used in a sample electrochlorination device.
Figure 23A:
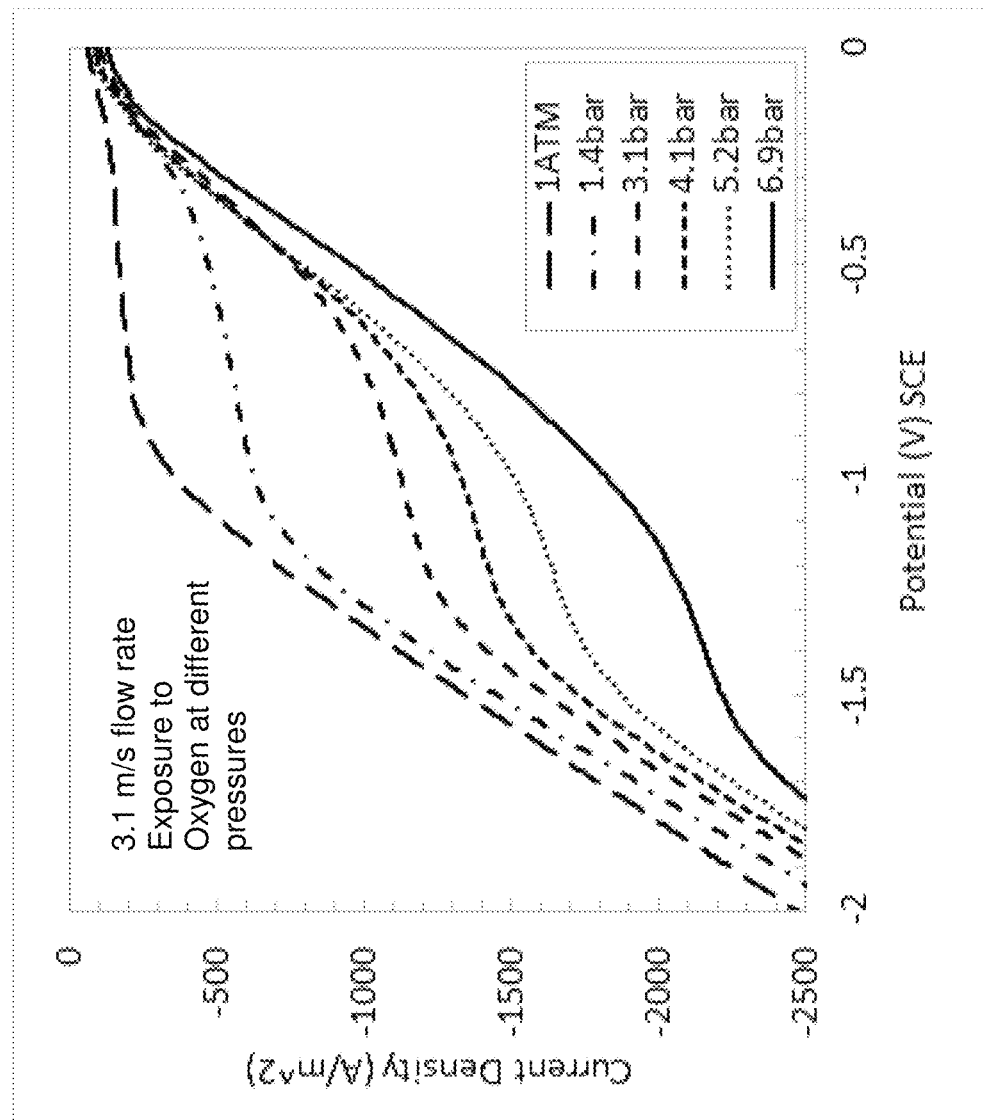
FIG. 23A is a chart of I-V curves taken from brine passing through a test electrochlorination device under different conditions.
Figure 23B:
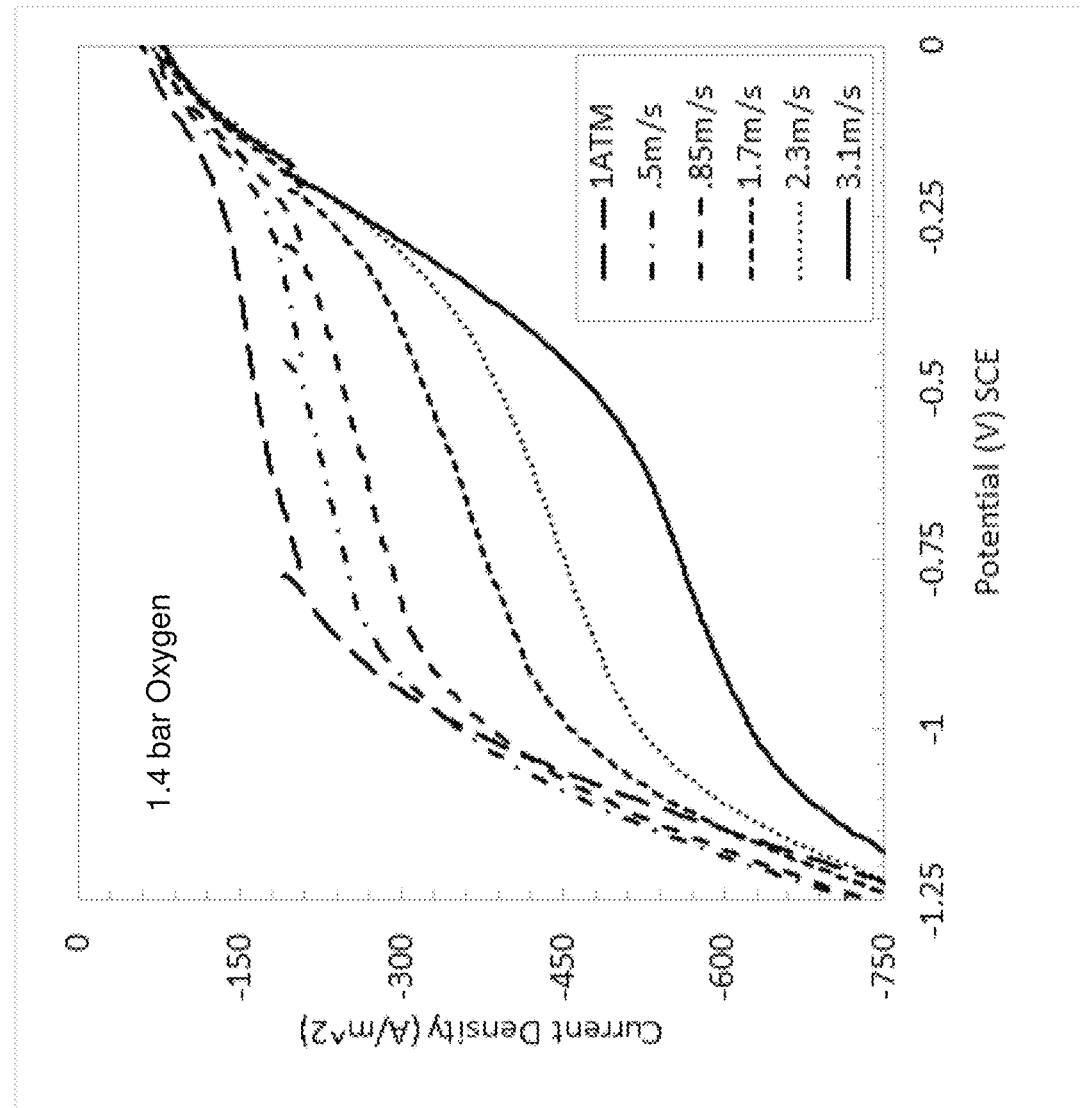
FIG. 23B is another chart of I-V curves taken from brine passing through a test electrochlorination device under different conditions.
Figure 23C:
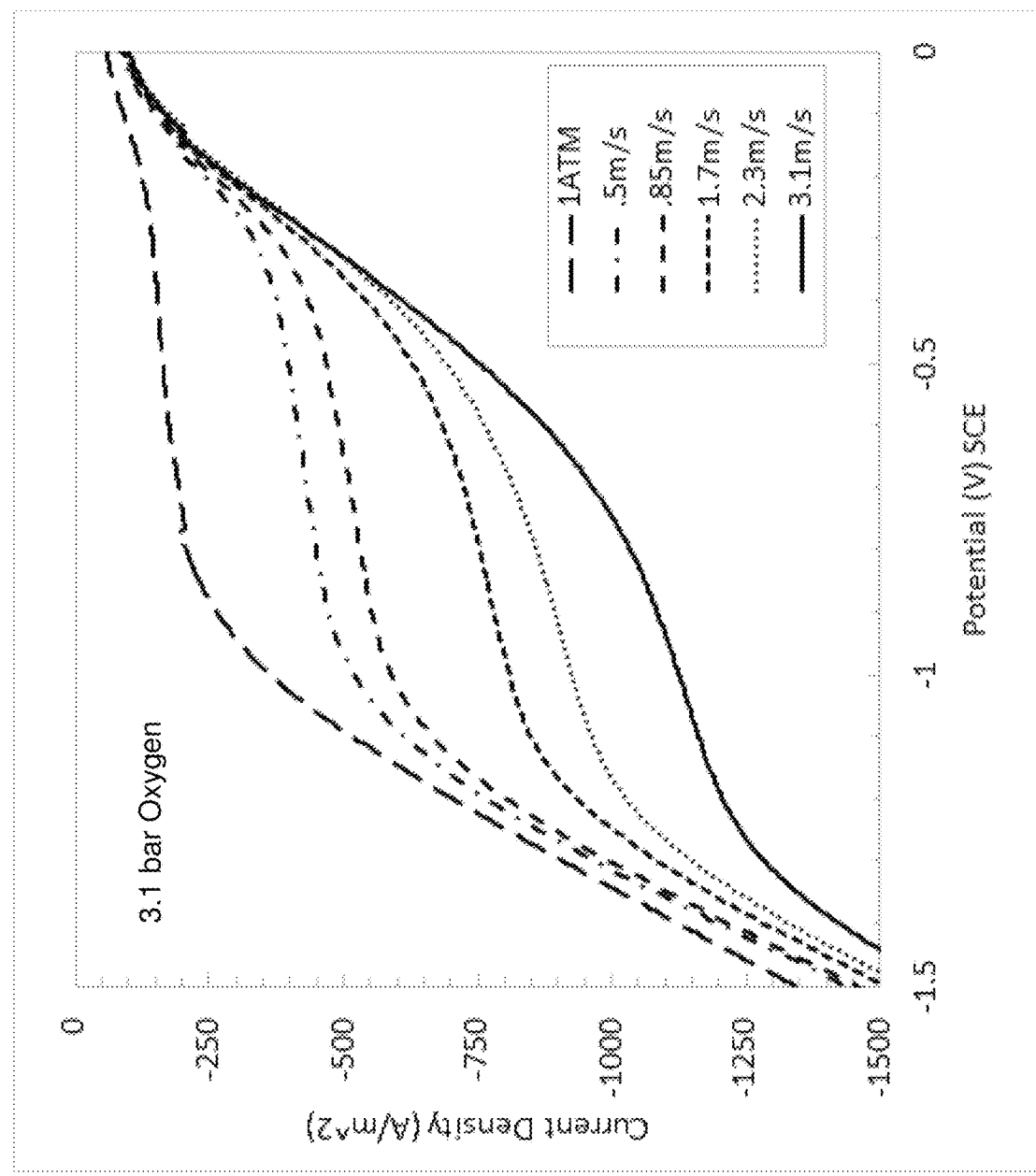
FIG. 23C is another chart of I-V curves taken from brine passing through a test electrochlorination device under different conditions.
Figure 23D:
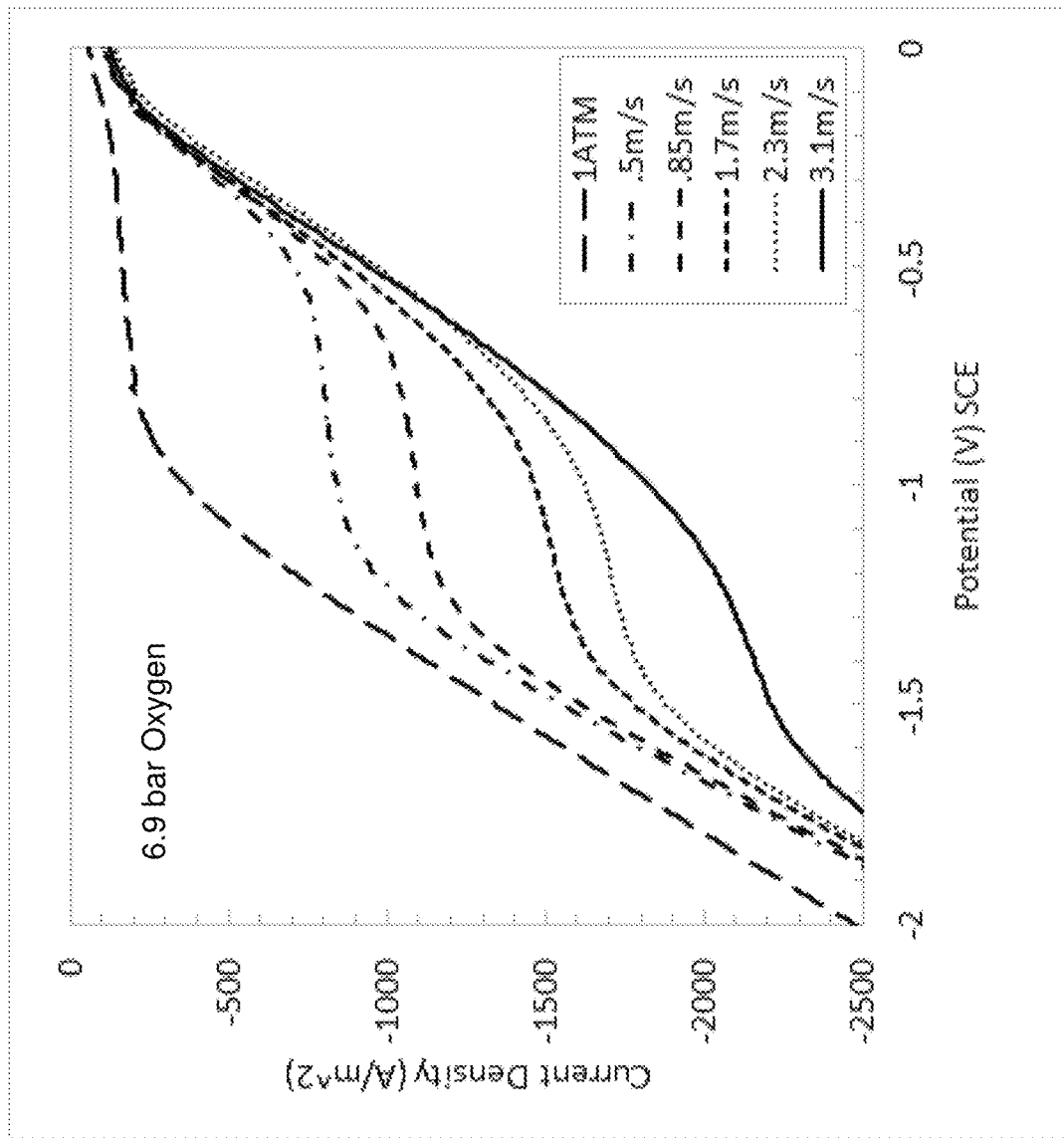
FIG. 23D is another chart of I-V curves taken from brine passing through a test electrochlorination device under different conditions.
Figure 23E:
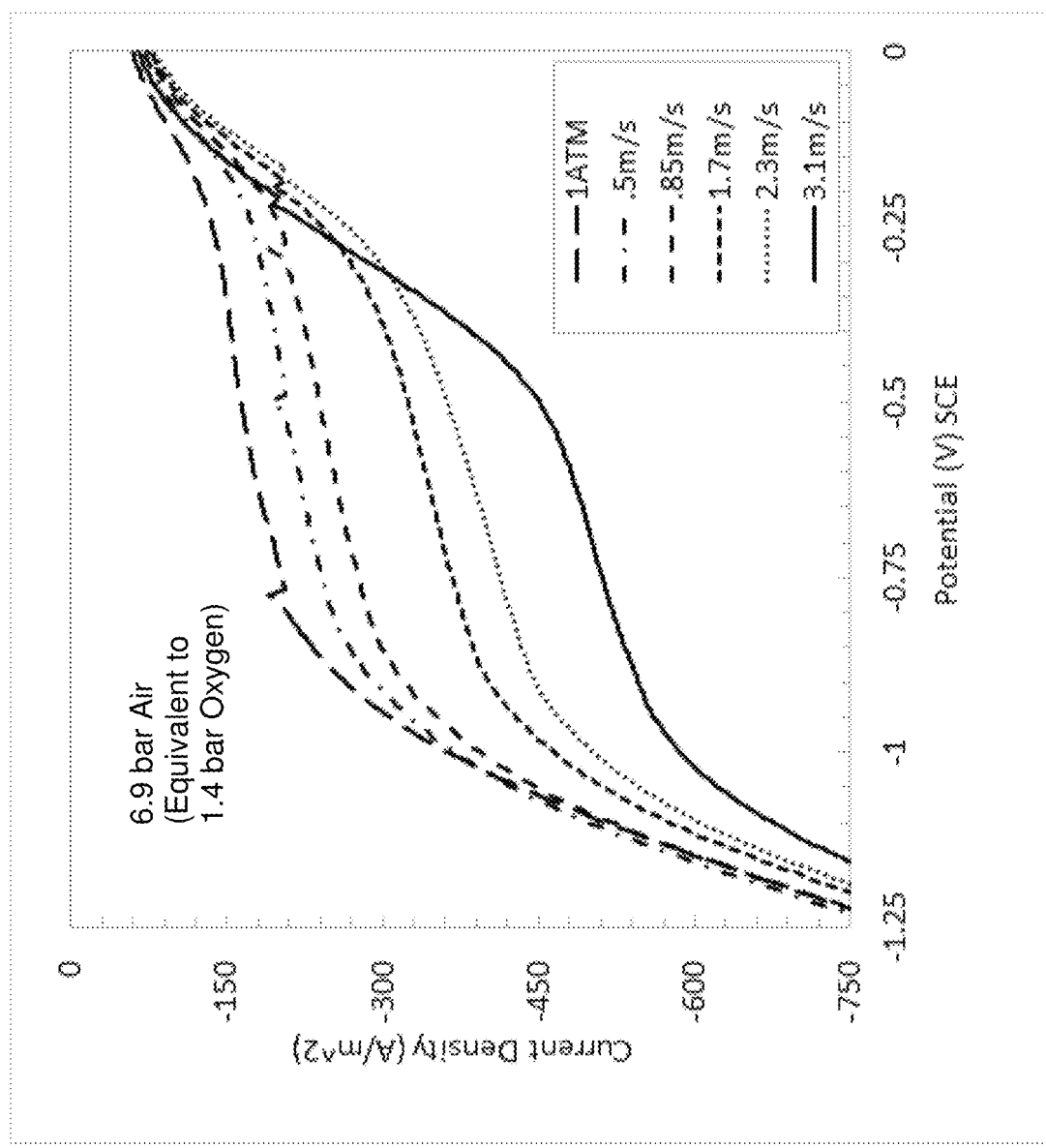
FIG. 23E is another chart of I-V curves taken from brine passing through a test electrochlorination device under different conditions.

An exemplary I-V curve is illustrated in FIG. 22. From this curve, it can be seen at what voltages and currents hydrogen was generated at the cathode (the WE) in accordance with the reaction $NaCl+H_2O\rightarrow NaOCl+H_2$ and at what voltages and currents hydrogen generation was suppressed due to presence of oxygen in the brine solutions. In the I-V curve of FIG. 22 the line labelled "1 ATM" represents a brine solution that was not exposed to pressurized air or oxygen but included only a native concentration of oxygen. The line labelled "6.9 bar" represents a brine solution pressurized with oxygen at a pressure of 6.9 bar gauge. (All pressures referred to in this example and in the I-V curves in the figures are gauge pressures, except the pressures referenced as "1 ATM" which is atmospheric pressure, or zero gauge pressure.) In the exemplary I-V curve of FIG. 22, inflection points, identified by stars, are present in the reaction mechanisms. The inflection points are the turning points between different reactions, namely, the cathodic reaction turns from an oxygen consumption reaction to a hydrogen formation reaction. Points on the lines to the left of the starred inflection points represent conditions under which hydrogen was generated. Points on the lines to the right of the starred inflection points represent conditions under which oxygen was consumed by reaction under which free hydrogen is not generated.

As can be seen in the exemplary I-V curve of FIG. 23, as the oxygen concentration in the brine was increased due to exposure to increased air pressure, hydrogen generation was suppressed at greater current densities (corresponding to greater sodium hypochlorite generation on the anode). In the brine that was exposed to air at atmospheric pressure, hydrogen generation began at a current density of about −200 A/m². In contrast, for the brine that was exposed to air at 6.9 bar, hydrogen generation did not begin until about −2250 A/m². This data shows that elevated pressure of dissolved oxygen in brine may provide for a significant increase in the amount of sodium hypochlorite that can be generated from the brine in an electrochlorination cell prior to the onset of hydrogen generation.

FIGS. 23A-23E illustrate I-V curves generated using different flow rates of brine through the sample electrochlorination device after exposure to different pressures of air or oxygen. In the charts illustrating different flow rates (FIGS. 23B-23E), the "1 ATM" curve represents the baseline illustrated in FIG. 23A in which brine exposed only to air at atmospheric pressure was passed through the electrochlorination cell at 3.1 m/s. As can be seen from these charts, as oxygenation of the brine increased, either by switching from air to oxygen or by increasing the gas pressure to which the brine was exposed, the I-V curves dropped to lower positions on the charts. This indicates that with increased oxygenation of the brine the sample electrochlorination device was able to operate at higher current densities, and thus to produce more sodium hypochlorite from the brine before hydrogen generation began. Similarly, as the flow rate of the brine through the sample electrochlorination device increased, the I-V curves dropped to lower positions on the charts. Without being bound to a particular theory, it is believed that with increased flow rate of oxygenated brine through the sample electrochlorination device oxygen consumed by reaction with hydrogen was more quickly replenished. Increasing the flow rate of the brine thus provided for the device to operate at higher current densities, and thus produce more sodium hypochlorite before hydrogen generation began.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A hydrogen abatement system comprising:
a source of an oxidizing agent fluidly connectable to a source of a chloride-containing aqueous solution;
a plurality of sensors constructed and arranged to measure at least one operating parameter of an electrochemical cell including a housing having an inlet in fluid communication with the source of a chloride-containing aqueous solution; and
a controller configured to regulate introduction of the oxidizing agent into the chloride-containing aqueous solution based on the measured value of the at least one operating parameter from the plurality of sensors to an amount sufficient to abate hydrogen gas in the electrochemical cell, the at least one operating parameter comprising at least a pH of the chloride-containing aqueous solution.

2. The system of claim 1, wherein the plurality of sensors comprises at least one of a temperature sensor, pH sensor, chemical sensor, flow sensor, electrical meter, and oxidation reduction potential (ORP) meter.

3. The system of claim 1, wherein the oxidizing agent includes one or more of gaseous oxygen, air, oxygen-enriched air, ozone, or hydrogen peroxide.

4. The system of claim 1, wherein an outlet of the housing of the electrochemical cell is fluidly connectable to a point of use.

5. The system of claim 4, wherein a disinfectant compound generated in the electrochemical cell is fluidly connected to the point of use through the outlet of the housing.

6. The system of claim 4, wherein the electrochemical cell further includes one or more oxidizing agent injection points in the housing between the inlet and the outlet.

7. The system of claim 4, wherein the point of use includes one of a shipboard system, a drilling platform system, an aquatics system, a drinking water system, or a downhole of an oil drilling system.

8. The system of claim 7, wherein the point of use includes one of a cooling water system and a ballast tank.

9. The system of claim 1, wherein the source of the chloride-containing aqueous solution includes one of seawater, brackish water, or brine.

10. The system of claim 1, wherein the source of the oxidizing agent includes a gas separation system.

11. The system of claim 1, further comprising an oxygenation system configured to mix the oxidizing agent with the chloride-containing aqueous solution upstream of the electrochemical cell.

12. The system of claim 11, wherein the oxygenation system includes one or more of an aeration vessel, a dissolved air flotation pump, a mixing vessel, or a venturi.

13. The system of claim 1, further comprising a conduit configured to deliver the chloride-containing aqueous solution from the source of chloride-containing aqueous solution to the inlet of the housing and including an injection point for the oxidizing agent.

14. The system of claim 1, wherein an anode-cathode pair of the electrochemical cell is disposed substantially concentrically within the housing about a central axis of the housing and defines an active area between an anode and a cathode of the anode-cathode pair, an active surface area of at least one of the anode and the cathode having a surface area greater than a surface area of an internal surface of the housing.

15. The system of claim 14, wherein the anode-cathode pair includes a plurality of concentric electrode tubes and gaps defined between adjacent electrode tubes.

\* \* \* \* \*